(12) United States Patent
Wey et al.

(10) Patent No.: US 11,589,180 B2
(45) Date of Patent: Feb. 21, 2023

(54) ELECTRONIC APPARATUS, CONTROL METHOD THEREOF, AND RECORDING MEDIUM

(71) Applicant: SAMSUNG ELECTRONICS CO., LTD., Suwon-si (KR)

(72) Inventors: Hoseok Wey, Suwon-si (KR); Michael Kohnen, Suwon-si (KR); Min Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/270,208

(22) PCT Filed: Aug. 21, 2019

(86) PCT No.: PCT/KR2019/010637
§ 371 (c)(1),
(2) Date: Feb. 22, 2021

(87) PCT Pub. No.: WO2020/040541
PCT Pub. Date: Feb. 27, 2020

(65) Prior Publication Data
US 2021/0337340 A1 Oct. 28, 2021

(30) Foreign Application Priority Data
Aug. 21, 2018 (KR) .................. 10-2018-0097715

(51) Int. Cl.
*H04S 7/00* (2006.01)
*G10L 19/008* (2013.01)
*H04N 5/60* (2006.01)

(52) U.S. Cl.
CPC ............ *H04S 7/303* (2013.01); *G10L 19/008* (2013.01); *H04N 5/607* (2013.01)

(58) Field of Classification Search
CPC ...................................................... H04S 7/303
See application file for complete search history.

(56) References Cited

U.S. PATENT DOCUMENTS

| 6,766,028 B1 | 7/2004 | Dickens |
| 2005/0286727 A1 | 12/2005 | Otsuka |

(Continued)

FOREIGN PATENT DOCUMENTS

| JP | 2003-061195 | 2/2003 |
| JP | 2018-022981 | 2/2018 |

(Continued)

OTHER PUBLICATIONS

International Search Report for PCT/KR2019/010637, dated Dec. 23, 2019, 4 pages.

(Continued)

*Primary Examiner* — Ping Lee
(74) *Attorney, Agent, or Firm* — Nixon & Vanderhye, P.C.

(57) ABSTRACT

The disclosure relates to an electronic apparatus, a control method thereof, and a recording medium. The electronic apparatus includes: a signal processor configured to process a sound signal; and a processor configured to acquire positional information of a speaker that outputs sound, based on the processed sound signal, and perform a first correction so that a sound image of the sound signal has a predetermined reference spatial acoustic characteristic based on the acquired positional information of the speaker, and perform a second correction so that the sound image of the sound signal on which the first correction is performed has a target spatial acoustic characteristic.

11 Claims, 18 Drawing Sheets

(56) References Cited

U.S. PATENT DOCUMENTS

2020/0351606 A1* 11/2020 Seefeldt .................. H04S 7/302
2021/0168549 A1* 6/2021 Nakano .................. H04S 7/303

FOREIGN PATENT DOCUMENTS

KR     10-2002-0009425     2/2002
KR     10-2009-0129727     12/2009

OTHER PUBLICATIONS

Written Opinion of the ISA for PCT/KR2019/010637, dated Dec. 23, 2019, 5 pages.
Office Action dated Aug. 22, 2022 in KR Application No. 10-2018-0097715 and partial English-language translation.

* cited by examiner

ELECTRONIC APPARATUS, CONTROL METHOD THEREOF, AND RECORDING MEDIUM

This application is the U.S. national phase of International Application No. PCT/KR2019/010637 filed 21 Aug. 2019, which designated the U.S. and claims priority to KR Patent Application No. 10-2018-0097715 filed 21 Aug. 2018, the entire contents of each of which are hereby incorporated by reference.

FIELD

The disclosure relates to an electronic apparatus, a control method thereof, and a recording medium, and more particularly, to an electronic apparatus for processing a sound signal, a control method thereof, and a recording medium.

DESCRIPTION OF RELATED ART

An electronic apparatus having an audio output function such as television (TV) sound output from a TV outputs various sound signals such as broadcasting or multimedia content.

The audio output of the electronic apparatus may be implemented in various ways, but is often implemented by an audio system including a stereo speaker capable of outputting a sound signal. In recent years, the use of devices in a miniaturized/integrated form such as a sound bar is also increasing.

As described above, the electronic apparatus that outputs the sound signal is subjected to restrictions according to conditions such as a size of a speaker itself and a size or structure of an installation space.

Such installation restrictions may further increase as a screen of a TV continues to become slimmer and bigger. In addition, after the installation of the electronic apparatus, the output sound signal may often not provide the originally intended sound field effect.

SUMMARY

Accordingly, an object of the disclosure is to provide an electronic apparatus for installing a speaker outputting a sound signal without spatial restrictions, a control method thereof, and a recording medium.

Another object of the disclosure is to provide an electronic apparatus capable of realizing an extended sound field effect through a sound signal output from a speaker, a control method thereof, and a recording medium.

According to an aspect of the present disclosure, an electronic apparatus includes: a signal processor configured to process a sound signal; and a processor configured to acquire positional information of a speaker that outputs sound, based on the processed sound signal, perform a first correction so that a sound image of the sound signal has a predetermined reference spatial acoustic characteristic based on the acquired positional information of the speaker, and perform a second correction so that the sound image of the sound signal on which the first correction is performed has a target spatial acoustic characteristic.

The processor may select a head transfer function corresponding to the acquired positional information of the speaker from a database, derive a cross talk canceller function matrix that cancels an interference of each channel of the sound signal using the selected head transfer function, and perform the first correction on the sound signal using the derived cross talk canceller function matrix. The processor may perform the first correction for convolving the derived cross talk canceller function matrix with the sound signal.

The selected head transfer function may include a head transfer function of a directional path through which a sound wave output from the speaker reaches measuring points corresponding to both ears of a listener, and a head transfer function of a crosstalk path.

The sound signal having the reference spatial acoustic characteristic may have the sound image positioned at a reference point within a head of a listener.

The processor may select a head transfer function corresponding to a predetermined target point from a database, and perform the second correction for convolving the selected head transfer function with the sound signal on which the first correction is performed.

The sound signal having the target spatial acoustic characteristic may have the sound image extended to a target point outside a head of a listener. The sound signal on which the second correction is performed may have an extended sound field so that a sound image has the target spatial acoustic characteristic, and may be positioned at a virtual sound source position corresponding to a predetermined target point.

The electronic apparatus may further include: a detector configured to detect a movement of the listener, in which the processor may identify a position of the listener based on the detection result of the detector, reacquire the positional information of the speaker indicating a position relative to the identified position of the listener, and perform the first correction and the second correction on the sound signal based on the reacquired positional information of the speaker.

The speaker may be provided in plural corresponding to the number of channels of the sound signal, and the plurality of speakers may be arranged at an atypical distance or angle with respect to the listener in an installation space.

According to another aspect of the present disclosure, a control method of an electronic apparatus includes: acquiring positional information of a speaker that outputs sound corresponding to a sound signal; performing a first correction so that a sound image of the sound signal has a predetermined reference spatial acoustic characteristic based on the acquired positional information of the speaker; and performing a second correction so that the sound image of the sound signal on which the first correction is performed has a target spatial acoustic characteristic.

The performing of the first correction may include: selecting a head transfer function corresponding to the acquired positional information of the speaker from a database; deriving a cross talk canceller function matrix that cancels an interference of each channel of the sound signal using the selected head transfer function; and performing the first correction on the sound signal using the derived cross talk canceller function matrix. The performing of the first correction on the sound signal may include performing the first correction for convolving the derived cross talk canceller function matrix with the sound signal.

The selected head transfer function may include a head transfer function of a directional path through which a sound wave output from the speaker reaches measuring points corresponding to both ears of a listener, and a head transfer function of a crosstalk path.

The sound signal having the reference spatial acoustic characteristic may have the sound image positioned at a reference point within a head of a listener.

The performing of the second correction may include: selecting a head transfer function corresponding to a predetermined target point from a database; and performing the second correction for convolving the selected head transfer function with the sound signal on which the first correction is performed.

The sound signal having the target spatial acoustic characteristic may have the sound image extended to a target point outside a head of a listener. The sound signal on which the second correction is performed may have an extended sound field so that a sound image has the target spatial acoustic characteristic, and may be positioned at a virtual sound source position corresponding to a predetermined target point.

The control method of an electronic apparatus may further include: identifying a position of the listener based on the detection result of the detector that detects the movement of the listener; reacquiring the positional information of the speaker indicating a position relative to the identified position of the listener; and performing the first correction and the second correction on the sound signal based on the reacquired positional information of the speaker.

Meanwhile, in a computer-readable nonvolatile recording medium in which a program of a method executable by a processor of an electronic apparatus according to an embodiment of the disclosure is recorded, the method includes: acquiring positional information of a speaker that outputs sound corresponding to a sound signal; performing a first correction so that a sound image of the sound signal has a predetermined reference spatial acoustic characteristic based on the acquired positional information of the speaker; and performing a second correction so that the sound image of the sound signal on which the first correction is performed is a target spatial acoustic characteristic.

According to the electronic apparatus, the control method thereof, and the recording medium of the disclosure as described above, even when the plurality of speakers outputting the sound waves are atypically arranged, the sound images of the sound signals on the left and right channels are positioned at the origin, that is, the reference point within the head, there is no space restriction when installing the speaker.

In addition, according to the electronic apparatus, the control method thereof, and the recording medium of the disclosure, it is possible to realize the effect of extending the sound field while providing the audible comfort to the user by making the listener feel that the sound is being reproduced at the desired virtual position by the second correction.

In addition, according to the electronic apparatus, the control method thereof, and the recording medium of the disclosure, the user terminal or the electronic apparatus may automatically detect the positions of the user and the speaker and perform the first correction and the second correction based on the relative spatial position between the user and the left and right channel speakers according to the detection result, so it is possible to realize the effect of the sound field as if sound is being played in a virtual position such as a TV.

DETAILED DESCRIPTION OF EXAMPLE EMBODIMENTS

Figure 1:
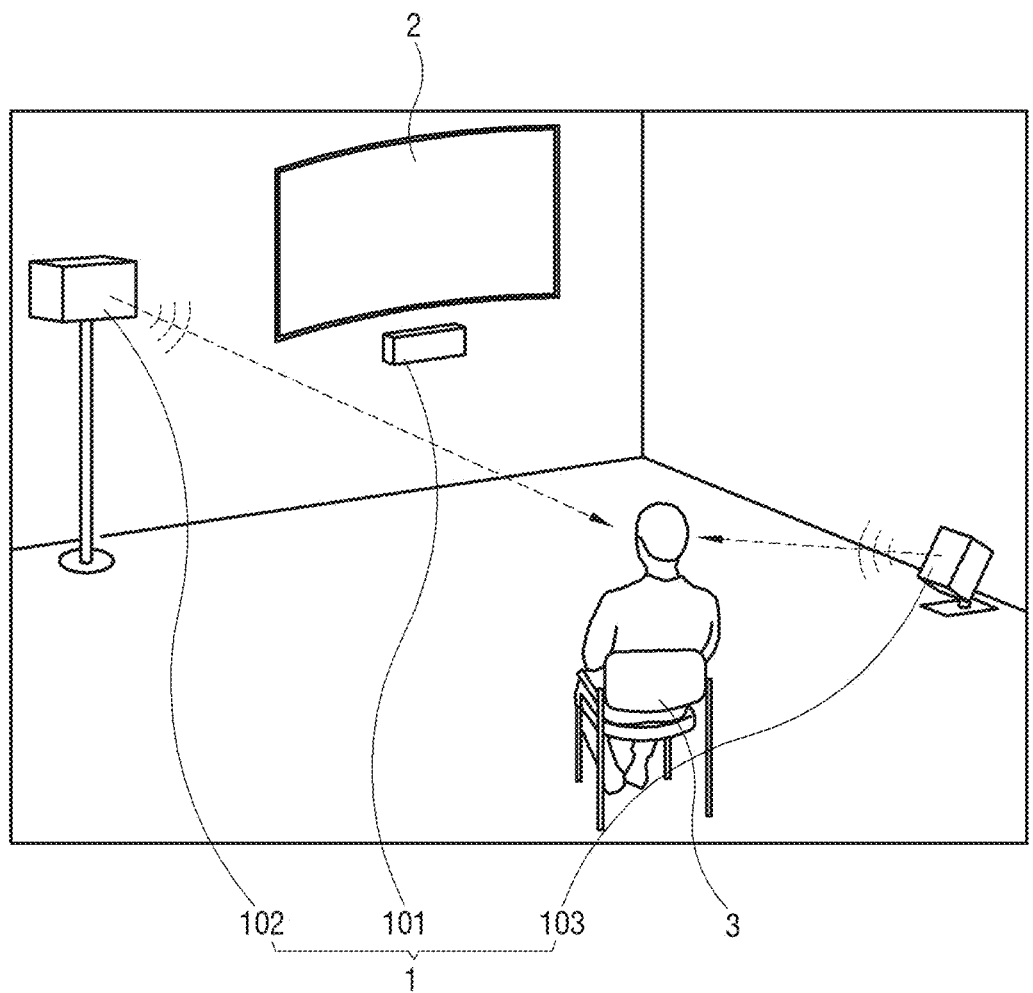
FIGS. 1, 2, and 3 are diagrams illustrating examples of an electronic apparatus according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in the embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

Figure 2:
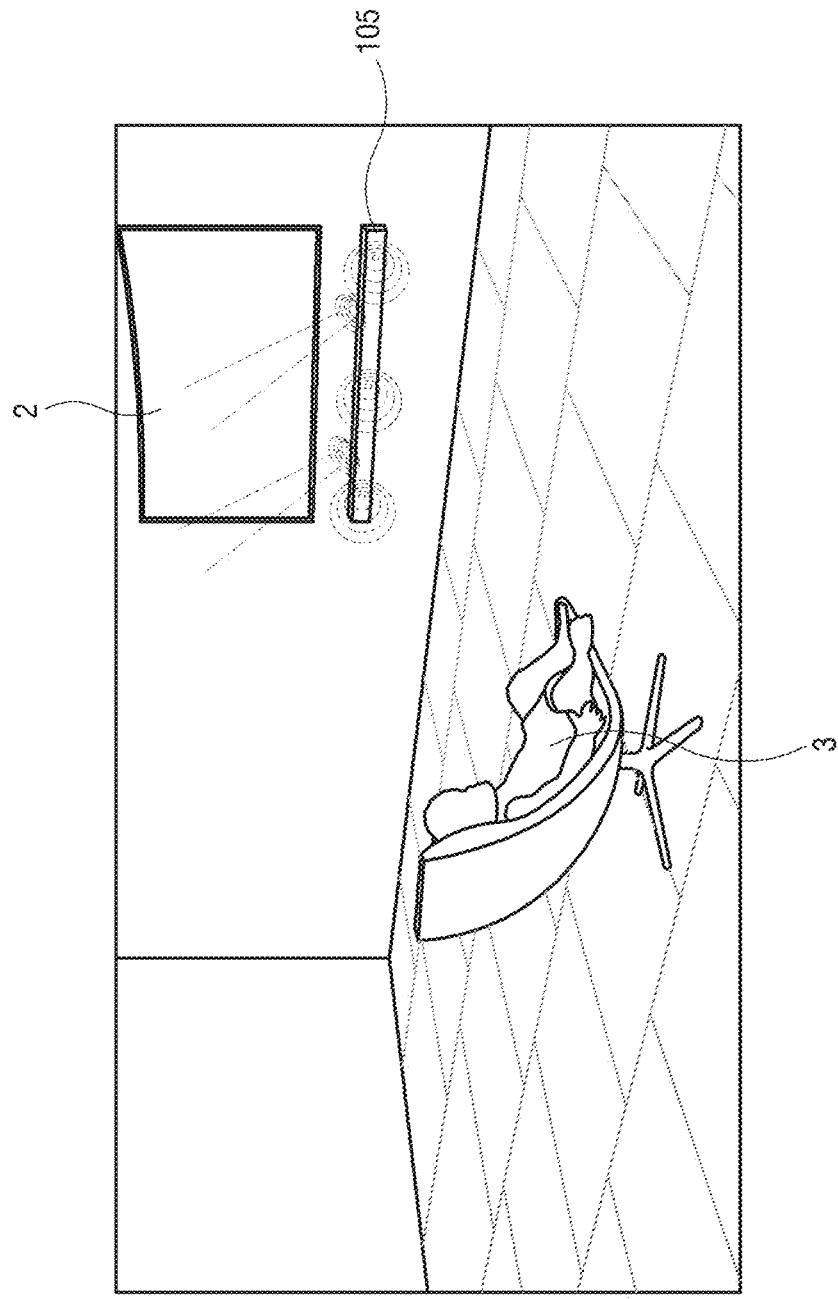
Figure 3:
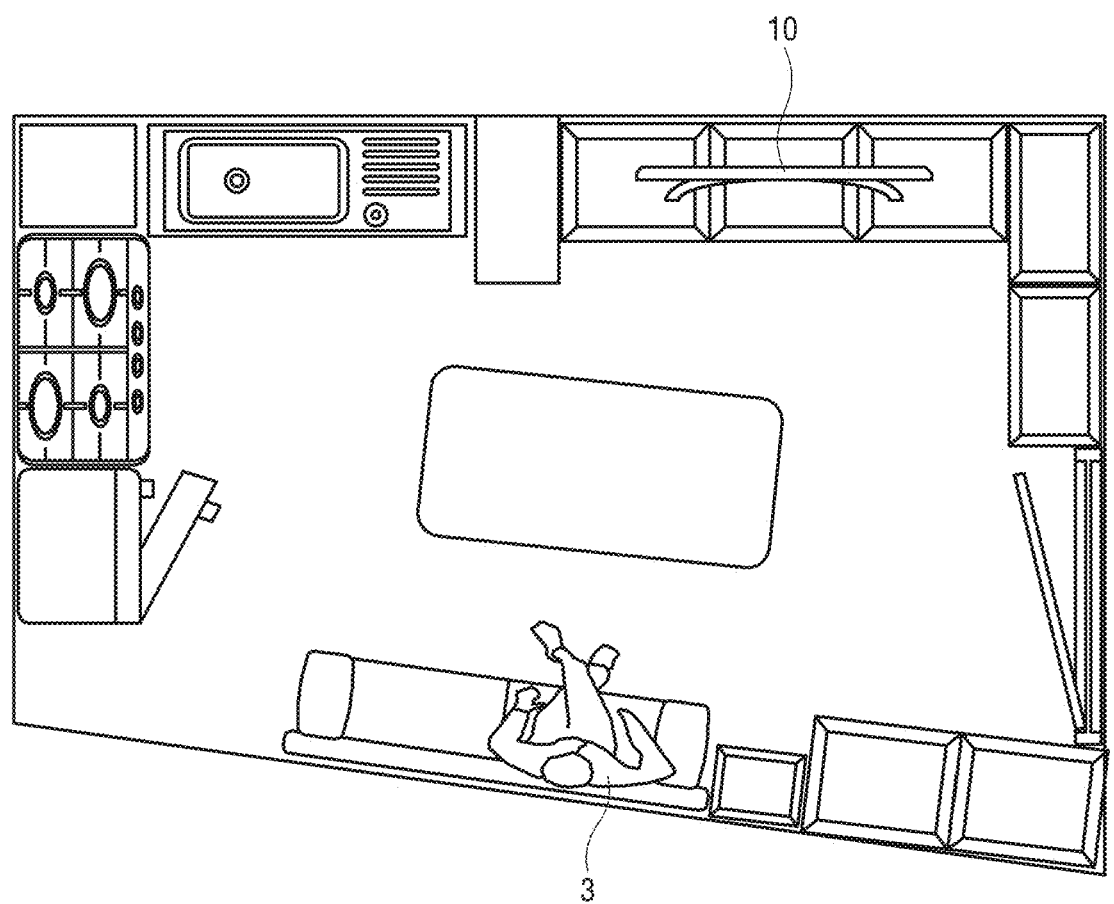

FIGS. 1 to 3 are diagrams illustrating examples of an electronic apparatus according to an embodiment of the disclosure.

An electronic apparatus 1 according to an embodiment of the disclosure provides a sound signal (also referred to as an audio signal or audio content) to a user. The electronic apparatus 1 may be implemented as a speaker device that includes a main body 101 and a speaker module including one or more loudspeakers (hereinafter also referred to as speakers) 102 and 103 capable of outputting sound. The main body 101 is provided with components that allow the electronic apparatus 1 to perform an operation, and the shape, installation location, and number of electronic apparatuses 1 are not limited to those illustrated in FIG. 1.

The electronic apparatus 1 implemented as the speaker device may receive an input sound signal from an external signal supply source 2 (for example, a television, etc.) through a communication interface (120 in FIG. 4), and process the received sound signal to generate the output sound signal. Sound corresponding to the processed sound signal is output from the speakers 102 and 103.

In the disclosure, the signal supply source 2 is not limited to the television illustrated in FIG. 1, and the electronic apparatus 1 may receive the input sound signal from various sources such as a set-top box (STB), an A/V receiver, an optical disk playback device such as DVD or Blu-ray, and a mobile device.

In an embodiment, the output sound signal generated by the electronic apparatus 1 is composed of a plurality of channel signals (for example, a left channel signal and a right channel signal), and each of the speakers 102 and 103 may output sound of a corresponding signal among the plurality of channel signals. For example, as illustrated in FIG. 1, the electronic apparatus 1 may be implemented as stereo channel audio systems provided on both sides of a TV as a signal supply source 2, and the left speaker device 101 may output sound of a left channel signal (Left-ch, L) and the right speaker device 102 may output sound of a right channel signal (Right-ch, R).

FIG. 1 illustrates an example of an embodiment in which the electronic apparatus 1 of the disclosure may be implemented, and the shapes and/or the number of speakers 102 and 103 constituting the speaker module may be variously implemented. That is, the electronic apparatus 1 may process and output a sound signal composed of 3, 5, 7, 9, or more channels, and output audio signals, that is, sound, of five channels composed of, for example, a center channel signal C, a left channel signal L, a right channel signal R, a left surround channel signal Ls, and a right surround channel signal Rs through a speaker.

In addition, the electronic apparatus 1 and the signal supply source 2 are not connected only by a wired manner, and the electronic apparatus 1 may receive the input sound signal by various types of wired or wireless connections (for example, Bluetooth, Wi-Fi, Wi-Fi Direct, etc.).

Here, the electronic apparatus 1 according to the embodiment of the disclosure may be implemented as an independent device separated from the speakers 102 and 103 as well as the signal supply source 2. In this case, the electronic apparatus 1 transmits the processed sound signal to the speakers 102 and 103. The speakers 102 and 103 may receive the processed sound signal from the electronic apparatus 1, and output sound based on the received sound signal.

As illustrated in FIG. 2, in another embodiment of the disclosure, the electronic apparatus 1 may be implemented as a speaker device 105 in the form of a sound bar installed under the TV serving as the signal supply source 2. The speaker device 105 implemented as the sound bar may receive the input sound signal from the signal supply source 2, and output the sound signal generated by processing the received input sound signal through a sound output unit, that is, a speaker that is included in the speaker device 105.

As another embodiment of the disclosure, as illustrated in FIG. 3, the electronic apparatus 10 may be implemented as a display apparatus such as a television (TV). When the electronic apparatus 10 is implemented as the display apparatus, the electronic apparatus 10 may output the sound signal through the sound output unit included therein or the speaker module connected to the electronic apparatus 10.

As described above, in the embodiment in which the electronic apparatus is the speaker device 105 in the form of the sound bar installed under the TV 2 (refer to FIG. 2) or is the TV 10 itself (refer to FIG. 3), the electronic apparatuses 105 and 10 are not installed at a front position facing a user 3, that is, a listener or a viewer, and may be atypically installed or arranged for the user as illustrated in FIG. 3.

Meanwhile, as another embodiment of the disclosure, the electronic apparatus may be implemented as various devices, such as a laptop, a tablet, a mobile phone, a multimedia player, an electronic frame, a digital billboard, LFD, a set-top box, an MP3 player, a DVD player, a BD player, and a radio device, an A/V receiver, a headphone, a headset, and a vehicle audio device, which may process a sound signal to be able to be output by itself or through a speaker connected to the electronic apparatus.

The electronic apparatuses 1 and 10 according to the embodiment of the disclosure process the input sound signal to generate an output sound signal. The output sound signal may include at least two or more channel signals (for example, a left channel signal and a right channel signal).

In an embodiment, the electronic apparatuses 1 and 10 change a sound image of the output sound signal to reproduce the output sound signal more realistically. The sound image refers to a position where an audio signal output from the electronic apparatuses 1 and 10 is virtually formed, and may represent the presence and position of a sound source that a person may feel through sound.

In the electronic apparatuses 1 and 10 according to the embodiment of the disclosure, by performing correction to position the sound image of the sound signal at a specific virtual position, an extended sound field (sound stage) effect that is more natural for users is realized.

Specifically, the electronic apparatuses 1 and 10 perform a first correction so that the sound image of the input sound signal has predetermined reference spatial acoustic characteristic, and perform a second correction so that the sound image of the sound signal on which the first correction is performed has target spatial acoustic characteristic, thereby generating the output sound signal. Here, the output sound signal may be provided to a user (listener) as stereophonic sound.

Hereinafter, a configuration of the electronic apparatus according to the embodiment of the disclosure will be described in more detail.

Figure 4:
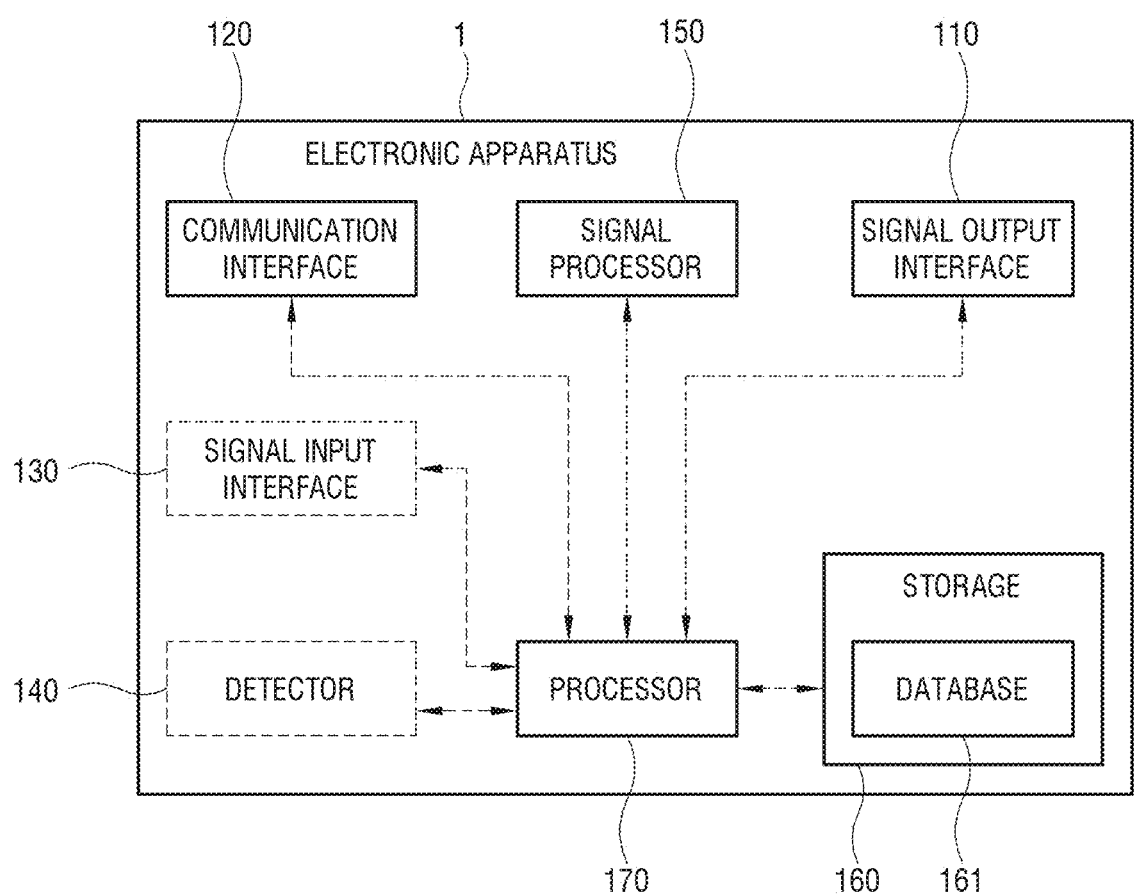
FIG. 4 is a block diagram illustrating a configuration of the electronic apparatus according to the embodiment of the disclosure.

FIG. 4 is a block diagram illustrating the configuration of the electronic apparatus according to the embodiment of the disclosure.

As illustrated in FIG. 4, the electronic apparatus 1 according to the embodiment of the disclosure includes a signal output interface 110, a communication interface 120, a signal input interface 130, a detector 140, a signal processor 130, a storage 160, and a processor 170.

However, the configuration of the electronic apparatus 1 according to the embodiment of the disclosure illustrated in FIG. 4 is only an example, and the electronic apparatus according to another embodiment may be implemented in configurations other than the configuration illustrated in FIG. 4. That is, the electronic apparatus of the disclosure may be implemented in a form in which configurations other than the configurations illustrated in FIG. 3 are added, or at least one of the configurations illustrated in FIG. 3 is excluded. For example, the detector 140 illustrated in FIG. 4 may be excluded from the electronic apparatus 1 in some cases.

The signal output interface 110 is provided to output a sound signal in, for example, a 20 Hz to 20 KHz band which is an audible frequency.

In an embodiment, the signal output interface 110 includes one or more speakers. The speaker may be provided in plural corresponding to the number of channels of the sound signal, and may include, for example, a left speaker L 102 and a right speaker R 103 as illustrated in FIG. 1.

In another embodiment, the signal output interface 110 may include an interface for transmitting the output sound signal to the speakers 102 and 103. The interface includes at least one connector or terminal according to standards such as AES3 or S/PDIF. Here, the speakers 102 and 103 may be included in the electronic apparatus 1 or may be independent devices separated from the electronic apparatus 1.

In another embodiment, the speakers 102 and 103 may receive the output sound signal from the electronic apparatus 1 by wired or wireless communication. In this case, the electronic apparatus 1 may transmit the sound signal to the speakers 102 and 103 through the communication interface 120 to be described later. Here, the speakers 102 and 103 are independent devices separated from the electronic apparatus 1.

The speakers 102 and 103 according to the embodiment of the disclosure may be installed at various positions in consideration of the position of the signal supply source 2, the size of an installation space, and the like. That is, in the disclosure, it is possible to set the installation range of the speakers 102 and 103 that may provide a sweet spot, which is an optimum listening area in which the listener 3 may enjoy the optimum sound field effect.

In one embodiment, the left and right speakers 102 and 103 are installed such that a distance or an angle with respect to both ears of the listener 3 in the installation space is atypically or asymmetrically positioned or flexibly located. In addition, the electronic apparatus 1 of the disclosure includes the case where the left and right speakers 102 and 103 are different types of speakers.

Figure 5:
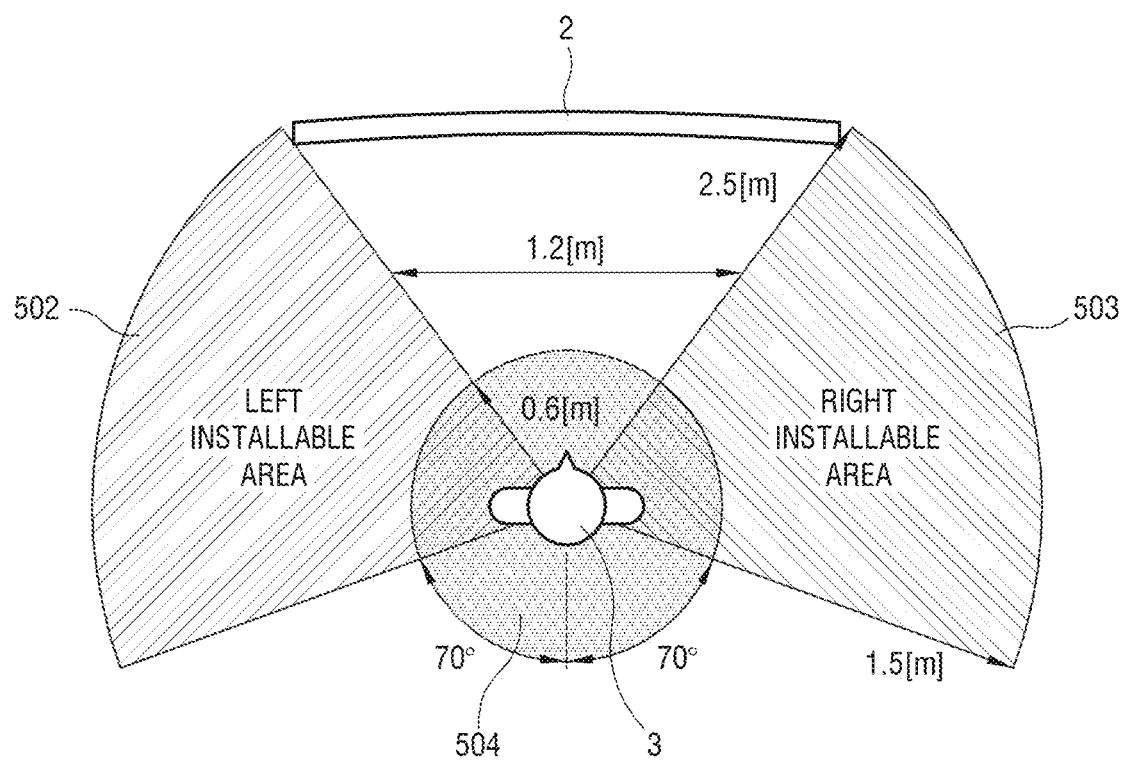
FIGS. 5 and 6 are diagrams for describing a position where a speaker may be installed according to an embodiment of the disclosure.
Figure 6:
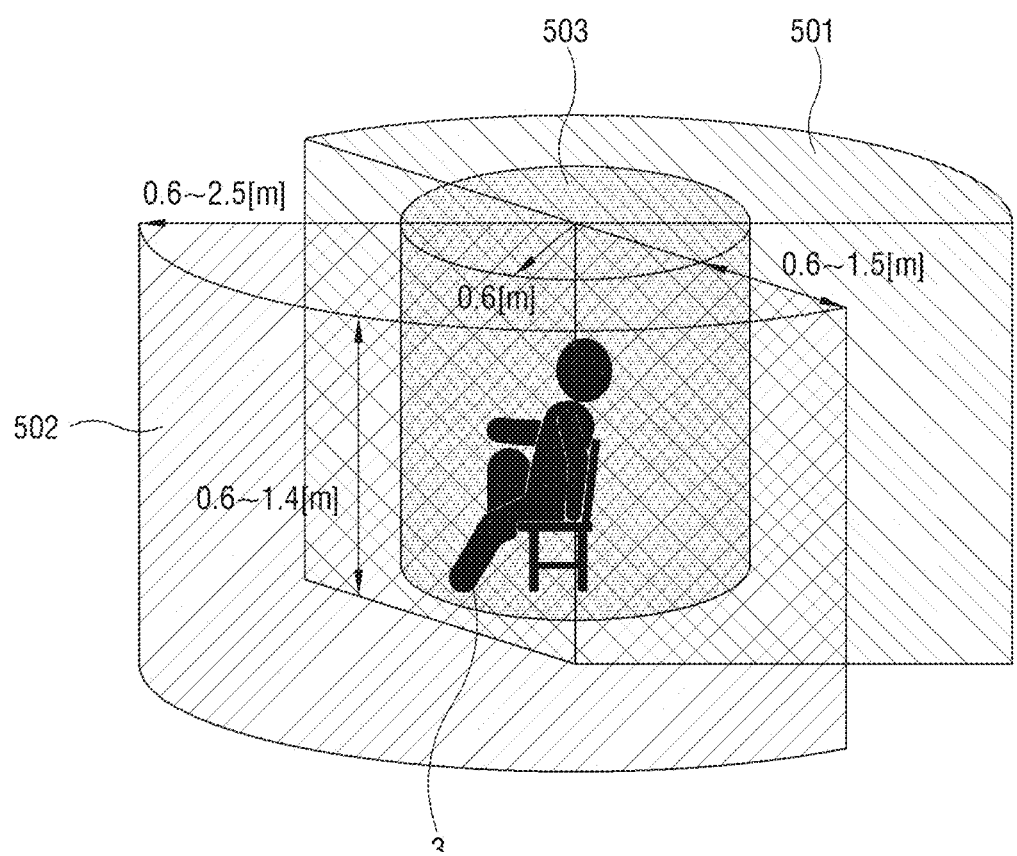

FIGS. 5 and 6 are diagrams for describing a position where a speaker can be installed according to an embodiment of the disclosure.

In the electronic apparatus 1 according to the embodiment of the disclosure, the case where the loudspeakers 102 and 103 outputting sound based on the processed sound signal are installed at an arbitrary position within installable areas 502 and 503 illustrated in FIGS. 5 and 6. will be described as an example.

When it is assumed that the installation space of the electronic apparatus (1) is a typical viewing space with low reverberation/echo, the installable areas 502 and 503 are determined as an area in which an average sound pressure of the sound waves output from the sound source, that is, the speakers 102 and 103 is 90 dB or more. That is, it may be determined by an experimental value of measuring the average sound pressure in the specific installation space (viewing space) of the installable areas 502 and 503 as described above.

For example, when a size of the space where the TV as the signal supply source 2 is installed is 5 (W)×3 (H)×7 (D) [m] and a screen size of the TV is 19 to 100 [inch], an average sound pressure measured at a position where a distance between the listener 3 and the speakers 102 and 103 as the sound source is 2.3 [m] may be secured at 90 dB or more, and therefore is included in the installable areas 502 and 503. However, the size of the installation space of the TV is an example, and in the disclosure, conditions or restrictions on the size of the installation space hardly occur.

FIGS. 5 and 6 illustrate an example of the installable areas 502 and 503 of the speakers 102 and 103 determined by the above method, and a maximum radius where the speakers 102 and 103 can be installed in front of the listener 3 may be 2.5 [m] and a maximum radius where the speakers 102 and 103 can be installed in rear of the listener 3 may be 1.5 [m]. Further, the installable minimum radius is 0.6 [m] from a center of a head of the listener 3, and an area 504 within the installable minimum radius from the listener 3 may be excluded from the installable area. That is, as illustrated in FIG. 6, the speakers 102 and 103 can be installed in a range of 0.6 to 2.5 [m] from the left and right to the front side and 0.6 to 1.5 [m] to the rear side of the listener 3.

In the example illustrated in FIG. 5, the left installable area 501 and the right installable area 502 may be separated from each other by 1.2 [m] from a predetermined position in front of the listener 3, and may be separated from each other by 70°+70° in the rear of the listener 3.

The installable areas 502 and 503 of the speakers 102 and 103 determined as described in FIGS. 5 and 6 correspond to the range of the spatial area in which the correction is performed on a sensation of sound image localization of sound output through the speakers 102 and 103 according to the sound signal processing performed by the electronic apparatus 1 of the disclosure.

The communication interface 120 communicates with various external devices including the signal supply source 2.

The electronic apparatus 1 may receive the input sound signal through the communication interface 120, and the input sound signal may be received from various external signal supply sources 2 including a TV. The signal supply source 2 includes a set-top box that is connectable to a TV, an image processing device such as an optical disk player such as DVD or Blu-ray, and a mobile device such as a smartphone or a tablet, and the communication interface 120 may also receive the sound signal from the external server through the Internet.

The communication interface 120 is implemented by various communication methods corresponding to the external device including the signal supply source 2.

The communication interface 120 may be implemented as a communication circuitry including wireless communication modules (S/W module, chip, and the like) corresponding to various kinds of communication protocols.

According to an embodiment, the communication interface 120 includes a wireless LAN unit. The wireless LAN unit may be wirelessly connected to an external device through an access point (AP) under the control of the processor 170. The wireless LAN unit includes a Wi-Fi communication module.

In an embodiment, the communication interface 120 includes a short-range communication module that supports direct communication between the electronic apparatus 1 and the external device wirelessly without an AP. The short-range communication module may include at least one of Wi-Fi direct, Bluetooth, Bluetooth low energy, radio frequency (RF) communication, infrared data association (IrDA), Zigbee, ultra wideband (UWB), and near field communication (NFC). When the electronic apparatus 1 performs direct communication with an external device 200, the storage 160 may store identification information (for example, a MAC address or an IP address) on the external device that is a communication target device.

In the electronic apparatus 1 according to the embodiment of the disclosure, the communication interface 120 is provided to perform wireless communication with the external device by at least one of the wireless LAN unit and the wireless communication module according to performance.

According to an embodiment, the communication interface 120 may include a wired communication module such as Ethernet. In another embodiment, the communication interface 120 may further include a communication module using various communication methods such as mobile communication such as LTE, EM communication including a magnetic field, and visible light communication.

In an embodiment, the communication interface 120 may include a connector for transmitting/receiving signals/data according to standards such as high definition multimedia interface (HDMI), consumer electronics control (HDMI-CEC), USB, and component. Here, the communication interface 120 includes at least one connector or terminal corresponding to each of these standards.

In an embodiment, the communication interface 120 receives sound signals of two or more channels from the signal supply source 2. That is, the sound signal received through the communication interface 120 may include a stereo signal composed of a plurality of channels (discrete stereo channels) such as the left channel signal L and the right channel signal R, or an audio signal composed of more channel signals.

The signal input interface 130 receives sound waves output from the speakers 102 and 103 installed at a predetermined position. The signal input interface 130 includes a microphone capable of acquiring a sound wave, that is, a sound signal.

The sound wave input through the signal input interface 130 is converted into an electrical signal by a signal converter. In an embodiment, the signal converter includes an AD converter that converts an analog sound wave into a digital signal. In addition, in an embodiment, the signal converter may be included in the signal processor 150 to be described later.

In an embodiment, the sound waves corresponding to each of the left and right channels output from the plurality of speakers 102 and 103 may be input through the signal input interface 130 with a predetermined time difference. The information indicating the time difference may be used for acquiring the positional information of the speakers 102 and 103 to be described later, constructing a database using the same, or the like.

In another embodiment, the signal input interface 130 may be implemented as a separate device rather than a component included in the electronic apparatus 1. A mobile device including a smartphone equipped with hardware (for example, a microphone) capable of receiving sound waves is an example of a separate device provided with a signal input interface 130.

The detector 140 detects the movement of the listener 3.

In an embodiment, the detector 140 may acquire the positional information of the listener 3 by tracking a position (head position) where the listener 3 moves in real time or at regular time intervals.

The detector 140 may be implemented as, for example, an infrared camera, a thermal imaging camera, or the like capable of detecting a movement of a person.

The method of obtaining the positional information of the listener 3 by the detector 140 is not limited to the above-described example, and as another example, the positional information of the listener 3 may be acquired by using a terminal device carried by the listener 3, for example, an infrared camera, a motion recognition sensor, or a position sensor provided in a mobile phone, a remote control, or the like or by using an accessory or a sensor of a wearable device worn by the listener. The detector 140 may detect the sensor signal of the terminal device carried or worn by the listener.

The signal processor 150 processes the sound signal. The sound signal processed by the signal processor 120 is output from the speakers 102 and 103 to provide sound content to a user.

The signal processor 150 may be implemented as a microprocessor such as a digital signal processor (DSP).

In an embodiment, the signal processor 150 may be implemented as a form included in a main SoC mounted on a printed circuit board (PCB) embedded in the electronic apparatus 1, and the main SoC may further include a CPU that is an example implementing the processor 170 to be described later.

The storage 160 is configured to store various data of the electronic apparatus 1. The storage 160 should store data even when power supplied to the electronic apparatus 1 is cut off, and may be provided as a writable nonvolatile memory (writable ROM) to reflect fluctuations. That is, the storage 160 may be provided as any one of a flash memory, EPROM, or EEPROM. The storage 160 may further include a volatile memory such as DRAM or SRAM in which the read or write speed of the electronic apparatus 1 is faster than that of the nonvolatile memory.

Data stored in the storage 160 includes, for example, various software, programs, applications, additional data, or the like that can be executed on an operating system, in addition to the operating system for driving the electronic apparatus 1.

In the electronic apparatus 1 according to the embodiment of the disclosure, a database DB 161 is provided in the storage 160 in which information on sound signals acquired for each positional information of a sound source is stored.

The information on the sound signal as described above is a head transfer function (head related transfer function (HRTF)) (hereinafter, also referred to as a transfer function) as an example.

The head related transfer function (HRTF) is a type of transfer function that represents the relationship between spatial information and frequency information occurring between a sound source and a path to an outer ear entrance of a listener in a free sound field, and may be used as a physical value that humans need to audibly feel a sound image.

In an embodiment, the database 161 may be constructed by data of a head transfer function measured by giving a variation to a distance condition from an origin as well as data of a head transfer function measured at several points where polar coordinate system images that can be formed using a listener's head as an origin are present, that is, points at a position where the distance from the origin is fixed. That is, the database 161 may be an HRTF DB having HRTF data based on a polar coordinate system having various types of radius distances.

Figure 7:
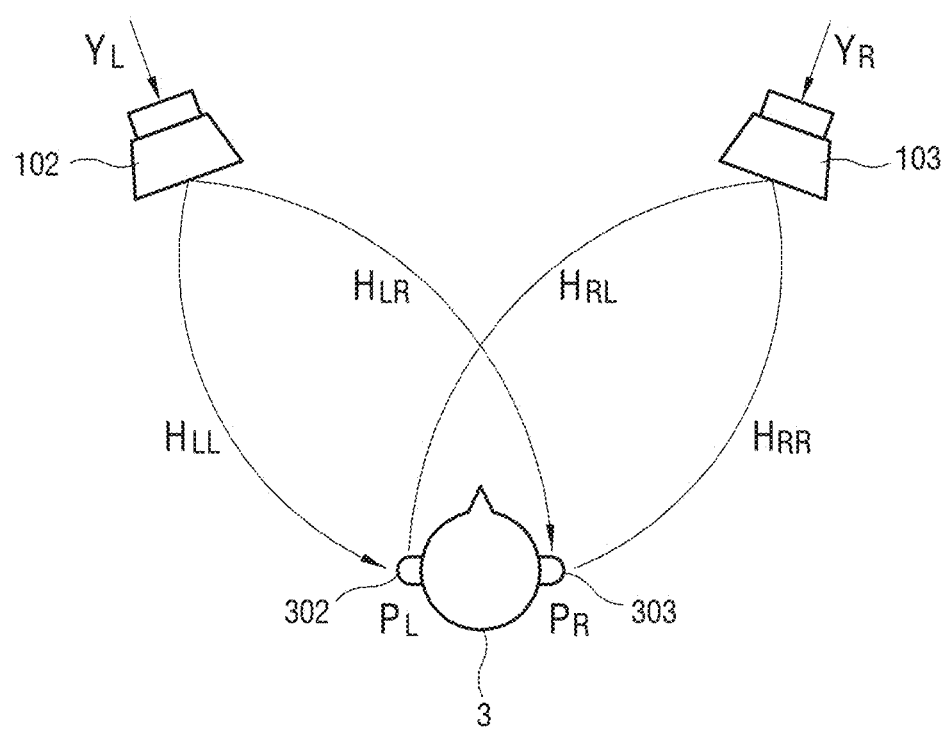
FIG. 7 is a diagram for describing a method of measuring a head transfer function according to an embodiment of the disclosure.
Figure 8:
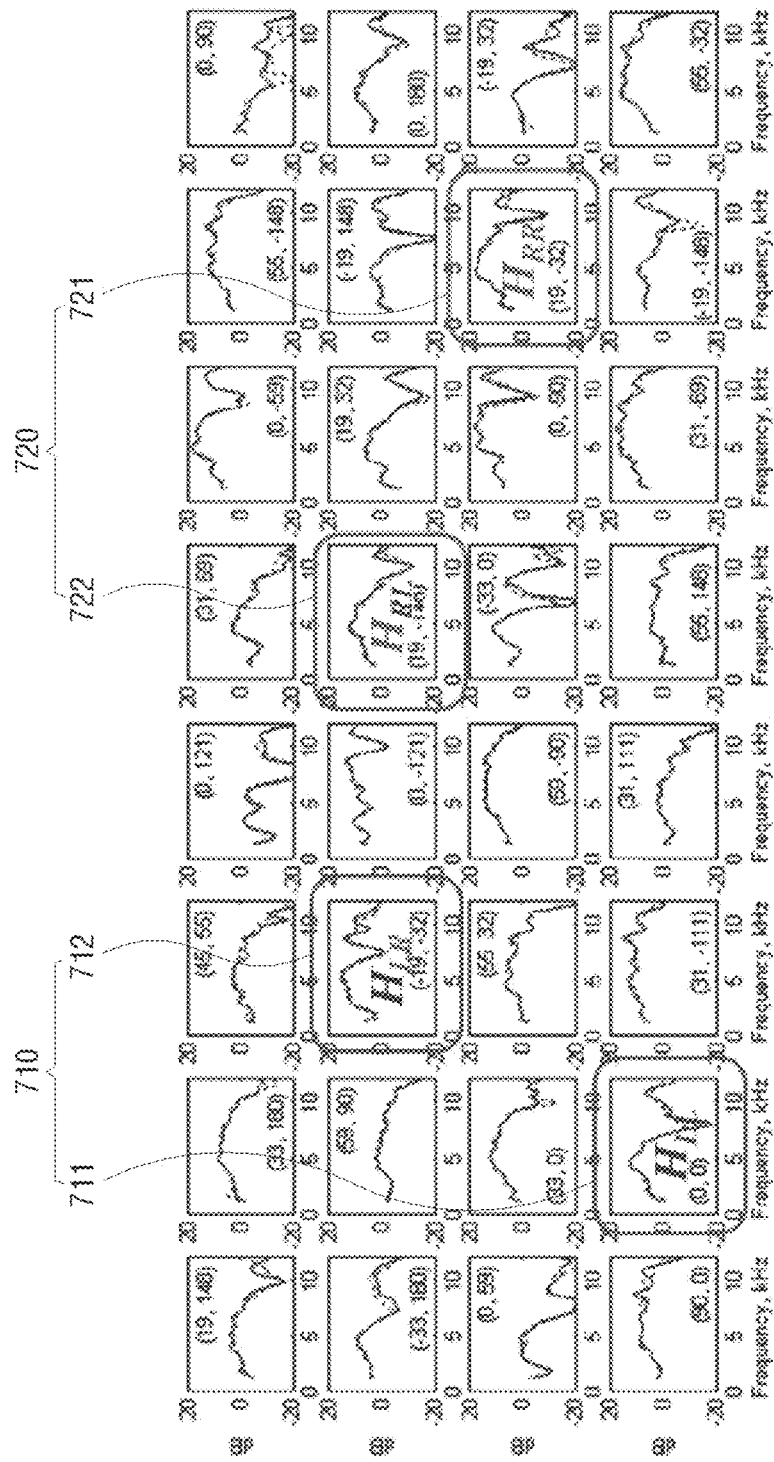
FIG. 8 is a diagram illustrating an example of a head transfer function database constructed by the method of FIG. 7.

FIG. 7 is a diagram for describing a method of measuring a head transfer function according to an embodiment of the disclosure, and FIG. 8 is a diagram illustrating an example of a head transfer function database constructed by the method of FIG. 7.

An example of a method of constructing an HRTF DB by measuring the head transfer function for each sound source position is as follows.

Specifically, in the space in which the left and right channel speakers 102 and 103 as illustrated in FIG. 1 or 2 can be installed, as illustrated in FIG. 7, two microphones (left microphone and right microphone) capable of receiving a sound wave (electroacoustic signal) for measurement, which is a type of test signal, are installed at each position (measuring points) 302 and 303 corresponding to both ears of the listener 3.

In addition, the speakers 102 and 103 as an example of a sound source generating a sound wave for measurement are installed at a position corresponding to a coordinate value for measuring the head transfer function with the positions of the microphone, which are the measuring points 302 and 303, as an origin. Here, the installed speakers 102 and 103 are mono channel loudspeakers as an example. In an embodiment, the speakers 102 and 103 may be installed in the installable areas 502 and 503 described in FIGS. 5 and 6.

In this state, the sound wave for measurement is reproduced by the speakers 102 and 103, and impulse responses corresponding to the reproduced sound waves are obtained (picked up) from two microphones installed at the measuring points 302 and 303. The impulse response picked up as described above becomes a signal representing the head transfer function.

In an embodiment, as illustrated in FIG. 7, two microphones acquire head transfer functions $H_{LL}$ and $H_{RR}$ corresponding to a directional path from each speaker 102 and 103 and head transfer functions $H_{LR}$ and $H_{RL}$ corresponding to a crosstalk path, respectively.

Specifically, when the position corresponding to the coordinate value of the sound source is the sound wave output from the speaker 102 close to the left microphone installed at the measuring point 302 corresponding to the left ear of the listener 3, the transfer function signal measured through the left microphone becomes the head transfer function $H_{LL}$ of the directional path, and the transfer function signal measured through the relatively farther right microphone becomes the head transfer function $H_{LR}$ of the crosstalk path.

In this way, a pair of transfer function signals $H_{LL}$ and $H_{LR}$ measured through the left and right microphones, respectively, are recorded in the database 161 as HRTF data of the speaker 102 corresponding to the left channel of the audio system.

In the same way, when the position corresponding to the coordinate value of the sound source is the sound wave output from the speaker 103 close to the right microphone installed at the measuring point 303 corresponding to the right ear of the listener 3, the transfer function signal measured through the right microphone becomes the head transfer function $H_{RR}$ of the directional path, and the transfer function signal measured through the relatively farther left microphone becomes the head transfer function $H_{RL}$ of the crosstalk path.

In this way, a pair of transfer function signals $H_{RR}$ and $H_{RL}$ measured through the left and right microphones, respectively, are recorded in the database 161 as HRTF data of the speaker 103 corresponding to the right channel of the audio system.

In addition, by combining the HRTF data acquired through the left and right microphones as described above, all of the head transfer functions $H_{LL}$, $H_{LR}$, $H_{RR}$, and $H_{RL}$ corresponding to the positions of the predetermined speakers 102 and 103 may be acquired.

Because humans have one ear on the left and one ear on the right to hear sound, humans may be aware of a position/direction which sound comes in. The head transfer function acquired as described above includes information on the relative positional relationship between each sound source depending on whether the sound source exists on the left or right in space. Therefore, in the disclosure, by using the head transfer functions $H_{LL}$, $H_{LR}$, $H_{RR}$, and $H_{RL}$ acquired as described above, it is possible to process a sound signal as if a sound wave is actually received through both ears of a person.

In the electronic apparatus 1 according to the embodiment of the disclosure, the head transfer functions $H_{LL}$, $H_{LR}$, $H_{RR}$, and $H_{RL}$ are acquired through the left and right microphones installed at the measuring points 302 and 303 while the positions of the speakers 102 and 103 are variously changed in the above-described manner, so the database 161 for the head transfer functions for each sound source position is constructed. Here, the positions of the speakers 102 and 103 may be changed within the installable areas 502 and 503 of FIG. 5.

An example of the HRTF database 161 constructed as described above is as illustrated in FIG. 8.

In another embodiment, the HRTF database as illustrated in FIG. 8 may be provided in an external device such as a server accessible through a wired or wireless network through the communication interface 120. In this case, the electronic apparatus 1 may receive necessary information, that is, HRTF data, from the external device provided with the database through the communication interface 120.

The processor 170 performs control to operate the overall configurations of the electronic apparatus 1. The processor 170 executes a control program (or instruction) to perform such a control operation. The processor 170 includes at least one general-purpose processor that loads at least a part of the control program from the nonvolatile memory in which the control program is installed into the volatile memory and executes the loaded control program, and may be implemented as, for example, a central processing unit (CPU), or an application processor (AP).

The processor may include a single core, a dual core, a triple core, a quad core, or a multiple-number core thereof. The processor may include a plurality of processors, for example, a main processor and a sub processor operating in a sleep mode (for example, only standby power is supplied and does not operate as a content providing apparatus). In addition, the processor, the ROM, and the RAM are interconnected via an internal bus, and the ROM and the RAM are included in the storage 160.

In the disclosure, the processor that is an example of implementing the processor 170 may be implemented in the form included in a main SoC mounted on a PCB embedded in the second electronic apparatus 1. In an embodiment, the main SoC may further include the signal processor 150 described above.

The control program may include a program(s) implemented in at least one of a BIOS, a device driver, an operating system, firmware, a platform, and an application program (application). As one embodiment, the application program may be pre-installed or stored in the electronic apparatus 1 at the time of manufacturing of the electronic apparatus 1, or installed in the electronic apparatus 1 based on data of the application program received from the outside when used later. The data of the application program may be downloaded to the electronic apparatus 1 from an external server such as an application market. Such an external server is an example of a computer program product of the disclosure, but is not limited thereto.

As an embodiment, the operation of the processor 170 may also be implemented as a computer program stored in a computer program product (not illustrated) separately provided from the electronic apparatus 1. In this case, the computer program product includes a memory in which an instruction corresponding to the computer program is stored, and a processor. When executed by the processor, the instruction acquires the positional information of the speaker that outputs sound based on the sound signal, performs the first correction so that the sound image of the sound signal has the predetermined reference spatial acoustic characteristic based on the acquired positional information of the speaker, and performs the second correction so that the sound image of the sound signal on which the first correction has been performed has the target spatial acoustic characteristic.

As a result, the processor 170 of the electronic apparatus 1 may download and execute the computer program stored in the separate computer program product to perform the operation of the instruction as described above.

Meanwhile, in another embodiment of the disclosure, the electronic apparatus may be implemented as a display apparatus such as a television, as described with reference to FIG. 3.

The configuration of the electronic apparatus 10 according to another embodiment differs from the electronic apparatus 1 according to the embodiment in that the electronic apparatus 10 further includes an image processor that processes an image signal and a display that displays an image, in addition to the signal output interface, the communication interface, the signal input interface, the detector, the signal processor, the storage, and the processor.

The image processor performs a process on the image and outputs the generated or combined signal to the display, so an image corresponding to the image signal is displayed on the display. The image processor may include a decoder that decodes an image signal to correspond to an image format of the electronic apparatus 10, and a scaler that adjusts the image signal to match an output standard of the display. The decoder of this embodiment may be implemented as, for example, a moving picture experts group (MPEG) decoder. Here, the type of the image processing process performed by the image processor of the disclosure is not limited.

The implementation scheme of the display may be implemented in various display schemes such as liquid crystal, plasma, a light-emitting diode, an organic light-emitting diode, a surface-conduction electron-emitter, carbon nanotube, and nano-crystal without any limitations. The display may additionally include an additional component (for example, driver) according to the implementation scheme.

The electronic apparatus 10 may wirelessly receive a radio frequency (RF) signal transmitted from a broadcasting station (not illustrated), or receive image signals according to composite video, component video, super video, SCART, high definition multimedia interface (HDMI), display port (DP) standards, and the like in a wired manner. When the electronic apparatus 10 is a TV, the electronic apparatus 10 may further include a tuner for tuning broadcast signals for each channel.

Therefore, components that perform the same operation as the electronic apparatus 1 of an embodiment in the electronic apparatus 10 of another embodiment use the same names, and detailed descriptions of these components will be omitted to avoid redundant description.

Figure 9:
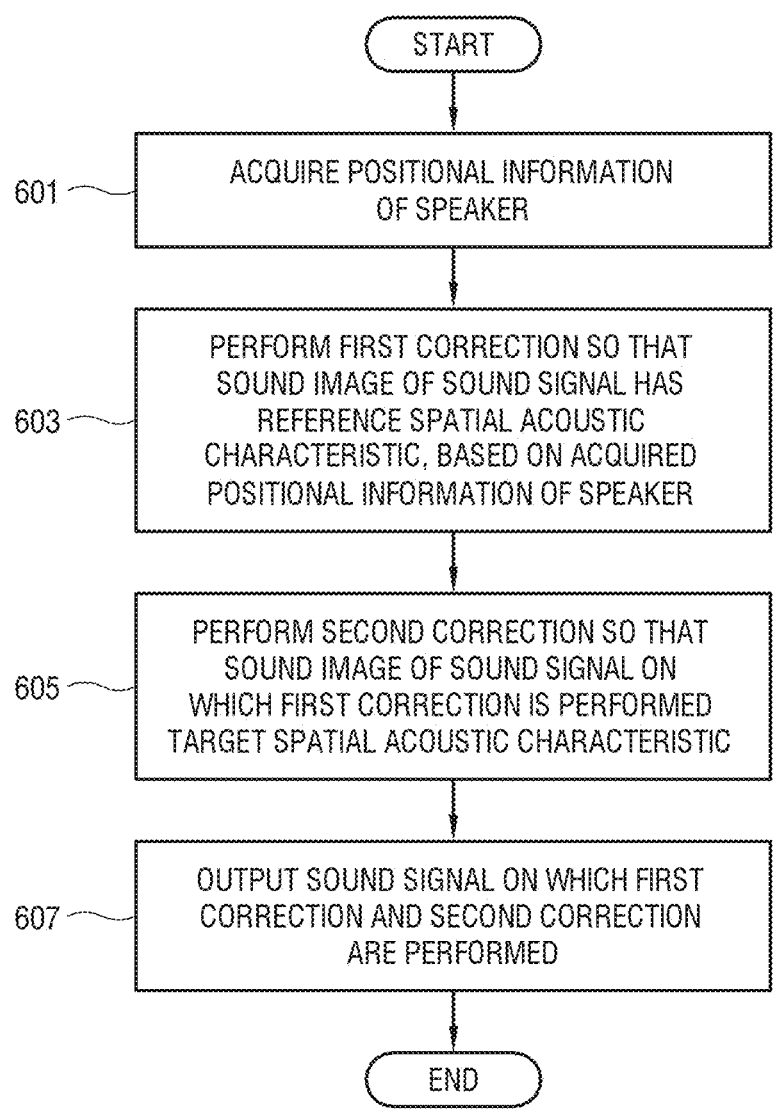
FIG. 9 is a flowchart illustrating a control method of an electronic apparatus according to an embodiment of the disclosure.

FIG. 9 is a flowchart illustrating a control method of an electronic apparatus according to an embodiment of the disclosure.

As illustrated in FIG. 9, the electronic apparatus 1 acquires the positional information of the speakers 102 and 103 (601). Here, the positions of the speakers 102 and 103 are a relative position to the position of the listener 3, and the positional information may be acquired by setting a three-dimensional space having a Cartesian coordinate system with the head position of the listener 3 as the origin.

FIGS. 10 to 13 are diagrams for describing a method of acquiring positional information of a speaker in the electronic apparatus according to the embodiment of the disclosure.

In an embodiment, the electronic apparatus 1 acquires the positional information of speakers 102 and 103 that output the sound signals of the left and right channels using an optical device such as an external camera. Here, as illustrated in FIG. 10, the external camera may be provided in an external device such as a smartphone 4, and the smartphone 4 is installed with an application (software) that performs an algorithm (for example, an image recognition algorithm and a spatial distance/angle calculation algorithm) capable of calculating approximate spatial positional information based on imaging data acquired through the camera.

Figure 10:
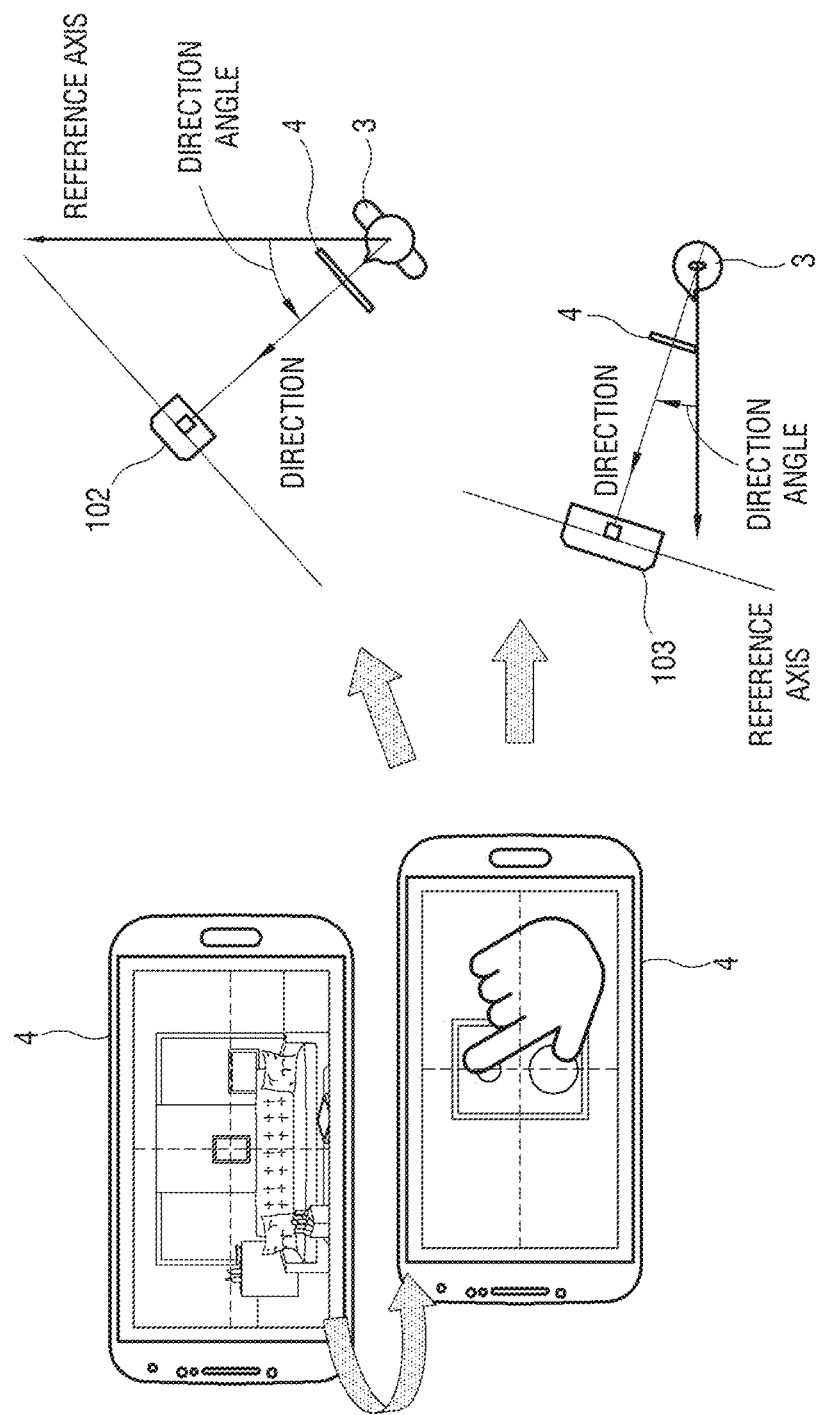
FIGS. 10, 11, 12, and 13 are diagrams for describing a method of acquiring positional information of a speaker in the electronic apparatus according to the embodiment of the disclosure.

Specifically, referring to FIG. 10, the listener 3 acquires image data captured by the camera of the smartphone 4 capable of understanding the positional relationship of the TV and the speakers 102 and 103 while facing the signal supply source 2, that is, the TV.

The smartphone 4 may use the installed algorithm to compare the image data and data representing an appearance sizes (horizontal and vertical length) of the speakers 102 and 103 and a ratio between the sizes, thereby measuring the positional information of the speakers 102 and 103, that is, a distance position ([m]) from the listener 3.

Here, the positional information further includes angle positions ([°]) with respect to the left and right speakers 102 and 103 in addition to the distance position measured as described above.

As illustrated in FIG. 10, the angle information may be acquired by using direction and direction angle information of both speakers 102 and 103 with respect to the head of the listener 3. The direction and the direction angle correspond to the positions of the speakers 102 and 103 with respect to a predetermined reference axis. In an embodiment, the reference axis may be set corresponding to the position of the signal supply source 1 from the listener 3.

When the reference axis is set as described above, the horizontal direction and direction angle and the vertical direction and direction angle corresponding to the left and right speakers 102 and 103, respectively, are estimated, and the angle position of the speakers 102 and 103 may be specified based on the estimation result.

The embodiment as described above may be implemented to specify the positional information (mounting position and angle position) of the speakers 102 and 103 using a separate device such as a PC for the image data acquired by the camera of the display apparatus 2 such as the smartphone 4 or the TV.

As described above, the positional information of the speakers 102 and 103 specified according to the embodiment is provided to the electronic apparatus 1 through the communication interface 120, so the electronic apparatus 1 acquires the positional information.

Figure 11:
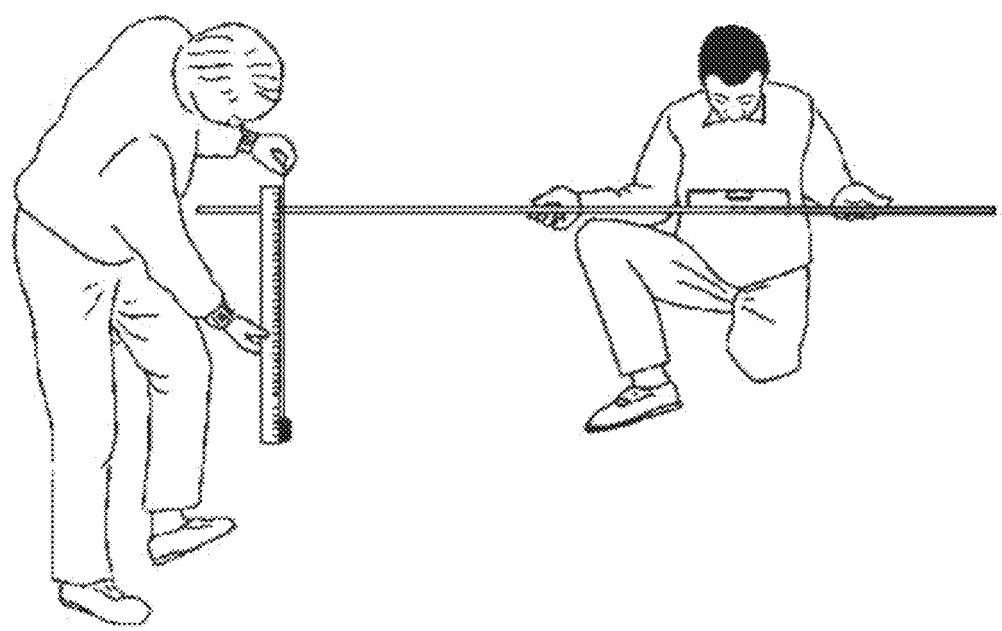

In another embodiment, as illustrated in FIG. 11, the listener 3 may directly measure the positional information of the speakers 102 and 103 using a physical distance measurement tool (for example, a tape measure, etc.), and manually input the measured spatial positional information to the electronic apparatus 1 as numerical data. To this end, the electronic apparatus 1 may be provided with a user input interface, or may be connected to input devices such as a remote control or a keyboard through the communication interface 120. Here, the input device includes a terminal device having a data input function.

In another embodiment, the electronic apparatus 1 may acquire the position of the speaker using an external electronic apparatus such as a mobile phone or a smartphone. Here, the positional information of the speakers 102 and 103 may be acquired, for example, by measuring an output delay between the left and right speakers 102 and 103 corresponding to the left and right channels, respectively.

Figure 12:
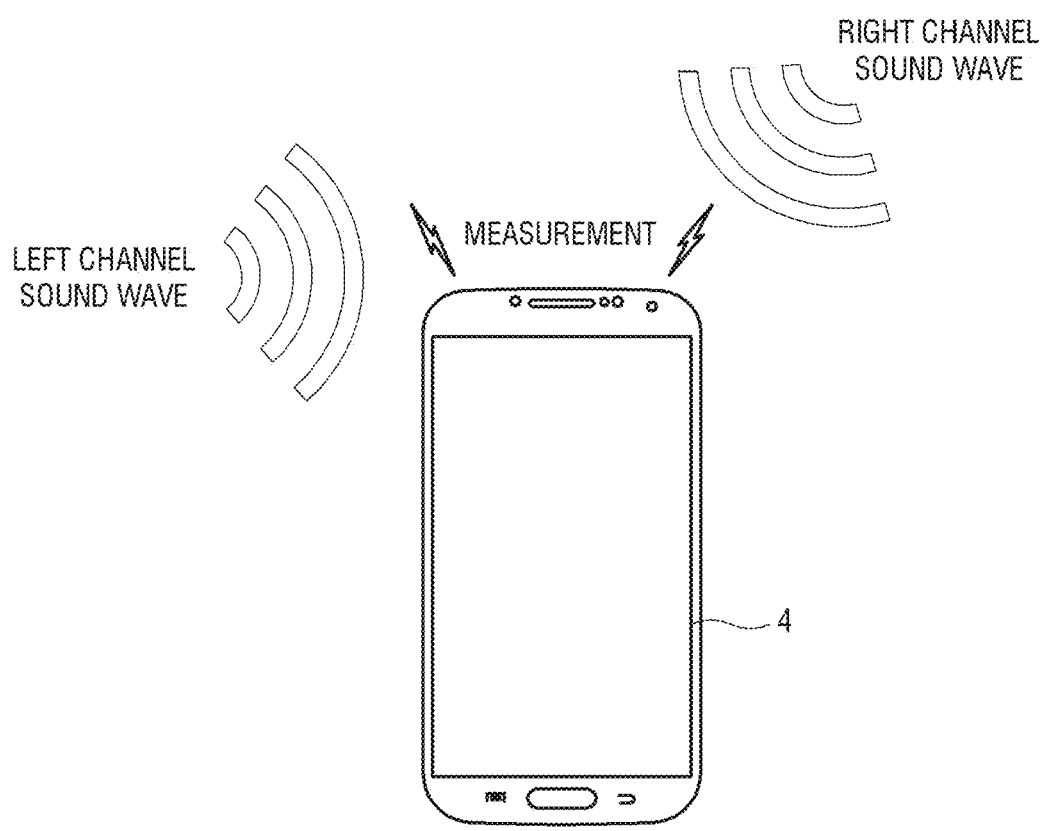

Specifically, the processor 170 of the electronic apparatus 1 controls a predetermined measurement signal, for example, a sine sweep signal, to be output by the left and right speakers 102 and 103, and receives the sound waves output from the left and right speakers 102 and 103 through a separate microphone. As illustrated in FIG. 12, the microphone may be provided in the external electronic apparatus such as the smartphone 4, and may receive the left channel sound wave output from the left speaker 102 and the right channel sound wave output from the right speaker 103, respectively. An application (software) that may perform an algorithm capable of measuring the sound wave input through a microphone is installed on the smartphone 4.

Figure 13:
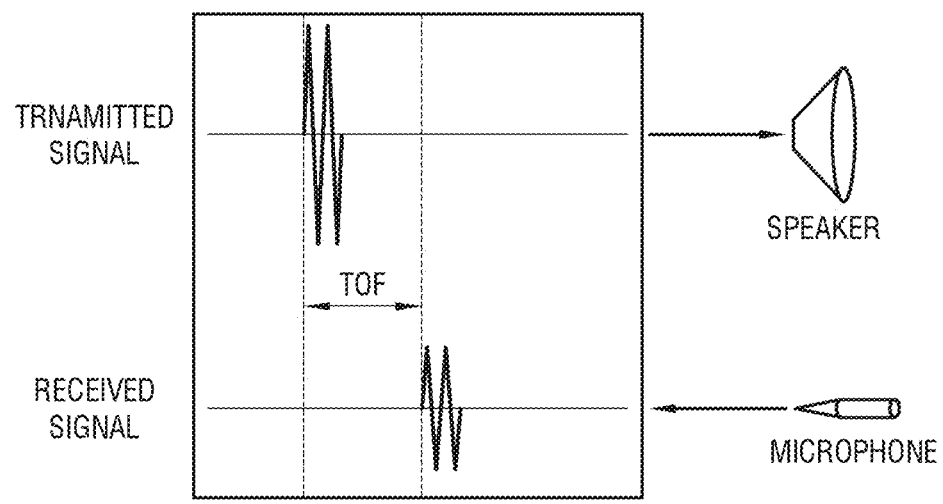

As illustrated in FIG. 13, each of the left channel sound wave and the right channel sound wave received through the microphone from the smartphone 4 is recorded as a measurement result to which output signal time latency according to a playback latency, that is, a time of flight (TOF) is reflected.

The smartphone 4 may calculate delay characteristic corresponding to the time difference between the output signals from the left and right speakers 102 and 103 recorded as described above, and may acquire the positional information of the speakers 102 and 103 by the calculated delay characteristic.

Alternatively, the processor 170 of the electronic apparatus 1 may receive the measurement results of the sound waves for both channels corresponding to the left and right speakers 102 and 103 from the smartphone 4 through the communication interface 120 to calculate the delay characteristic corresponding to the time difference between the two channels. The processor 170 may acquire the positional information of the speakers 102 and 103 based on the calculated delay characteristic.

In an embodiment, the calculated time difference, that is, the delay characteristic may be used to derive the cross talk canceller function matrix to be described later.

According to the embodiment of the disclosure, the positions of the user 3 and the speakers 102 and 103 may be automatically detected by various methods or combinations thereof as described above.

Specifically, the positional information of the speakers 102 and 103 may be understood by measuring the delay characteristic between the output signals of the left and right speakers 102 and 103 in the external electronic apparatus (user terminal) such as the mobile phone or the smartphone 4. Here, the acquired positional information of the speakers 102 and 103 may represent a position relative to the position of the user 3, and the user position may be understood by data acquired using an external device, for example, a camera (including an infrared camera) provided in the display apparatus 2 such as the TV or the user terminal 4 such as the mobile phone.

The method of obtaining the positional information of the speakers 102 and 103 or the user 3 in the disclosure is not limited to the above-described embodiments, and various position tracking methods using the electronic apparatus 1 or the external device may be used.

As illustrated in FIG. 9, the electronic apparatus 1 performs the first correction so that the sound image of the sound signal has the predetermined reference spatial acoustic characteristic, based on the positional information of the speakers 102 and 103 acquired in step 601 (603). Here, the sound signal X=[$Y_L$, $Y_R$] (input audio signal) to be corrected is provided, for example, to the speakers 102 and 103 from the signal supply source 2 such as the TV. In this case, the sound signal may correspond to the image content displayed on the TV.

Specifically, the processor 170 selects and read, from the database 161 constructed in the same manner as those described in FIGS. 7 and 8, head transfer functions $H_{LL}$, $H_{LR}$, $H_{RR}$, and $H_{RL}$ corresponding to the positional information of the speakers 102 and 103 acquired in step 701.

Here, as illustrated in FIG. 8, the head transfer function read by the processor 170 includes HRTF data 710 composed of a pair of HRTF $H_{LL}$ 711 of a directional path input from the speaker 102 corresponding to the left channel to the left microphone 302 and HRTF $H_{LR}$ 712 of a crosstalk path input to the right microphone 303, and HRTF data 720 composed of a pair of HRTF $H_{RR}$ 721 of a directional path input from the speaker 102 corresponding to the right channel to the right microphone 303 and HRTF $H_{RL}$ 722 of a crosstalk path input to the left microphone 302.

The processor 170 calculates the cross talk canceller function matrix $C=H^{-1}$ using the head transfer functions $H_{LL}$, $H_{LR}$, $H_{RR}$, and $H_{RL}$ 711, 712, 721, and 722 selected in response to the positional information of the speakers 102 and 103 as described above according to Equation 1 below, and derives $C=H^{-1} \approx H+$ using a pseudo-inverse matrix.

$$P = C \cdot H \cdot X \cdot Z^{-n} \quad \text{[Equation 1]}$$

where, $X=[Y_L, Y_R]$ as input audio signals, $P=[P_L, P_R]$ is reproduced signal pair.

$Z^{-n}$ as a time delay defined by spatial position of sound source.

$$H = \begin{bmatrix} H_{LL} & H_{LR} \\ H_{RL} & H_{RR} \end{bmatrix}$$

as a transfer function matrix by direct/indirect direction paths to each ear, where, $H_{LL}$ and $H_{RR}$ are transfer functions by direct paths to each ear, $H_{LR}$ and $H_{RL}$ are transfer functions by cross talked paths to each ear, $$C = H^{-1} = \frac{1}{H_{LL}H_{RR} - H_{LR}H_{RL}}$$

$$\begin{bmatrix} H_{RR} & -H_{LR} \\ -H_{RL} & H_{LL} \end{bmatrix} = \begin{bmatrix} \dfrac{H_{RR}}{H_{LL}H_{RR} - H_{LR}H_{RL}} & -\dfrac{H_{LR}}{H_{LL}H_{RR} - H_{LR}H_{RL}} \\ -\dfrac{H_{RL}}{H_{LL}H_{RR}\ H_{LR}H_{RL}} & \dfrac{H_{LL}}{H_{LL}H_{RR}\ H_{LR}H_{RL}} \end{bmatrix}$$

as a cross talk canceller function matrix.

$C = H^{-1} \approx H^+$, where $H^+$ is pseudo-inverse matrix that can be obtained by several approaches such a Moore-Penrose approach.

The crosstalk cancellation is performed for the purpose of canceling interference between sound waves radiated from each reproduction channel when the electroacoustic signals of the left and right channels are reproduced through an external speaker.

In the disclosure, by using the cross talk canceller function matrix calculated as above to process the sound signal $X = [Y_L, Y_R]$, the listener 3 may approximately realize a binaural listening condition which is an ideal stereo listening condition without the sound wave interference between the left and right channels.

As a method of calculating the pseudo-inverse matrix for deriving H+ from $H^{-1}$ in the above Equation 1, a Moore-Penrose inverse matrix calculation method may be used as an example.

In an embodiment, the output signal time-latency data between the left and right speakers 102 and 103 may be further used to derive the cross talk canceller function matrix.

In addition, the processor 170 performs the first correction on the input sound signal $X = [Y_L, Y_R]$ by the following Equation 2 using the cross talk canceller function matrix $C = H^{-1} \approx H^+$ calculated by the above Equation 1.

$$f[n] = H^{-1} \cdot X \cong H^+ \cdot X \qquad \text{[Equation 2]}$$

where, $X = [Y_L, Y_R]$ as input audio signals.

Specifically, the processor 170 performs the first correction for convolving the sound signal $X = [Y_L, Y_R]$ of the left and right channels with the cross talk canceller function matrix H+ derived by the above Equation 1.

Here, the sound image of the sound signal f[n] on which the first correction has been performed by the above Equation 2 has the predetermined reference spatial acoustic characteristic. The reference spatial acoustic characteristic means that the sound image is positioned within the head of the listener 3, that is, at the reference point within the head, and the sound signal with the reference spatial acoustic characteristic is spatially and acoustically equalized at the origin position corresponding to the head of the listener 3.

In the disclosure, the first correction performed on the sound signal as described above is also referred to as spatial equalization or in-head localization. The processor 170 may easily position the sound signal as a reference point by using the cross talk canceller function matrix for canceling the interference between the output channels for the first correction.

Accordingly, even when the left and right speakers 102 and 103 are atypically positioned (disposed) with each other, the sound images of the sound signals of the left and right channels are positioned at the origin, that is, the reference point within the head by the first correction as described above, so there is no problem that the sound field effect is deteriorated or weakened depending on the installation location of the speaker.

The processor 170 performs the second correction on the sound signal f[n] on which the first correction has been performed in step 603 so that the sound image has the target spatial acoustic characteristic by Equation 3 below (605).

$$\begin{aligned}(f * g_N)[n] &= \sum_{m=0}^{N-1} f[m] g_N[n-m] \qquad \text{[Equation 3]} \\ &= \sum_{m=0}^{n} f[m] g[n-m] + \sum_{m=n+1}^{N-1} f[m] g[N+n-m] \\ &= \sum_{m=0}^{N-1} f[m] g[(n-m)_{\bmod N}] \equiv (f *_N g)[n]\end{aligned}$$

where, f[n]: $H^+ \cdot X$ as spatially-equalized audio signals, $g_N[n]$: HRTF as virtual left-/right-ch. spatial characteristic signals.

Specifically, the processor 170 selects and reads a head transfer function $g_N[n]$ corresponding to a virtual sound source position corresponding to a predetermined target point (target point) from the database 161. The selected head transfer function $g_N[n]$ has predetermined virtual space acoustic characteristic.

Here, the target point corresponding to the selected head transfer function $g_N[n]$, that is, the virtual sound source position is the virtual positions of the left and right speakers where the listener 3 wants to output sound, and may be, for example, the position of the TV as the signal supply source 2 providing the sound signal. The virtual sound source position is different from the actual position of the atypically installed speaker, and when there are a plurality of virtual sound source positions, it is preferable that the distance and direction are typically positioned to be symmetric with respect to both ears of the listener 3.

In the disclosure, the target point, that is, the virtual sound source position is not limited, and may be preset as a default or may be set to various spatial positions according to the characteristic of the sound content, the taste of the user, that is, the listener 3, or the like. As another example, the virtual sound source position may be a predetermined position in front of the listener 3 different from the position of the TV. That is, as described in the embodiments of FIGS. 2 and 3, the electronic apparatuses 100 and 10 are sound bar-type speaker devices installed under the TV or a built-in speaker of the TV, and when the electronic apparatuses 100 and 10 are irregularly installed for the listener 3, it may be more natural to the listener 3 that the sound is reproduced from a predetermined virtual sound source position in front of the listener 3, not from the position of the TV.

The method of selecting, by a user, a virtual sound source position is not limited, and as an example, the user may directly input or select values (coordinate value, etc.) representing the spatial position of the target point using the user input interface provided in the electronic apparatus 1 or the input device connected through the communication interface 120.

The head transfer function $g_N[n]$ selected as described above is a head transfer function for replacement that allows sound to be reproduced at the virtual sound source position, and is selected to perform the second correction from the HRTF database 161 of the disclosure constructed by measuring the head transfer function for each position of various sound sources.

As illustrated in FIGS. 8 and 9, the head transfer function $g_N[n]$ corresponding to the virtual sound source position thus selected is composed of the input $H_{LL}$, $H_{LR}$, $H_{RR}$, and $H_{RL}$ in response to the directional path and the crosstalk path for each of the two microphones receiving the sound wave.

In addition, the processor 170 performs the second correction for convolving, that is, synthesizing the head transfer function of the selected virtual sound source position with the sound signal f[n] on which the first correction has been performed by the above Equation 2.

Here, the sound image of the sound signal $(f^*_N g)[n]$ (synthesized sound signal) on which the second correction has been performed by the above Equation 3 has the target spatial acoustic characteristic. The target spatial acoustic characteristic means that the sound image is positioned at the virtual position (for example, the position of the TV) corresponding to the predetermined target point, and for the sound signal with the target spatial acoustic characteristic, the sound image of the sound signal which is in-head-localized by the first correction has a sound field extended to the outside of the head of the listener 3.

In the disclosure, the second correction performed on the sound signal as described above is also referred to as out-of-head localization or sound field extension.

Accordingly, even when the left and right channel speakers are irregularly installed, the listener 3 feels that sound is being output/reproduced at the desired virtual position, thereby realizing the effect of extending the sound field that extends the so-called sweet spot as the optimal listening area while providing the audible comfort to the user. Here, an example of the virtual position is the position of the TV as the signal supply source 2.

In addition, the sound signal in which the first correction and the second correction have been performed in steps 603 and 605 are output from the speakers 102 and 103 (607).

Figure 14:
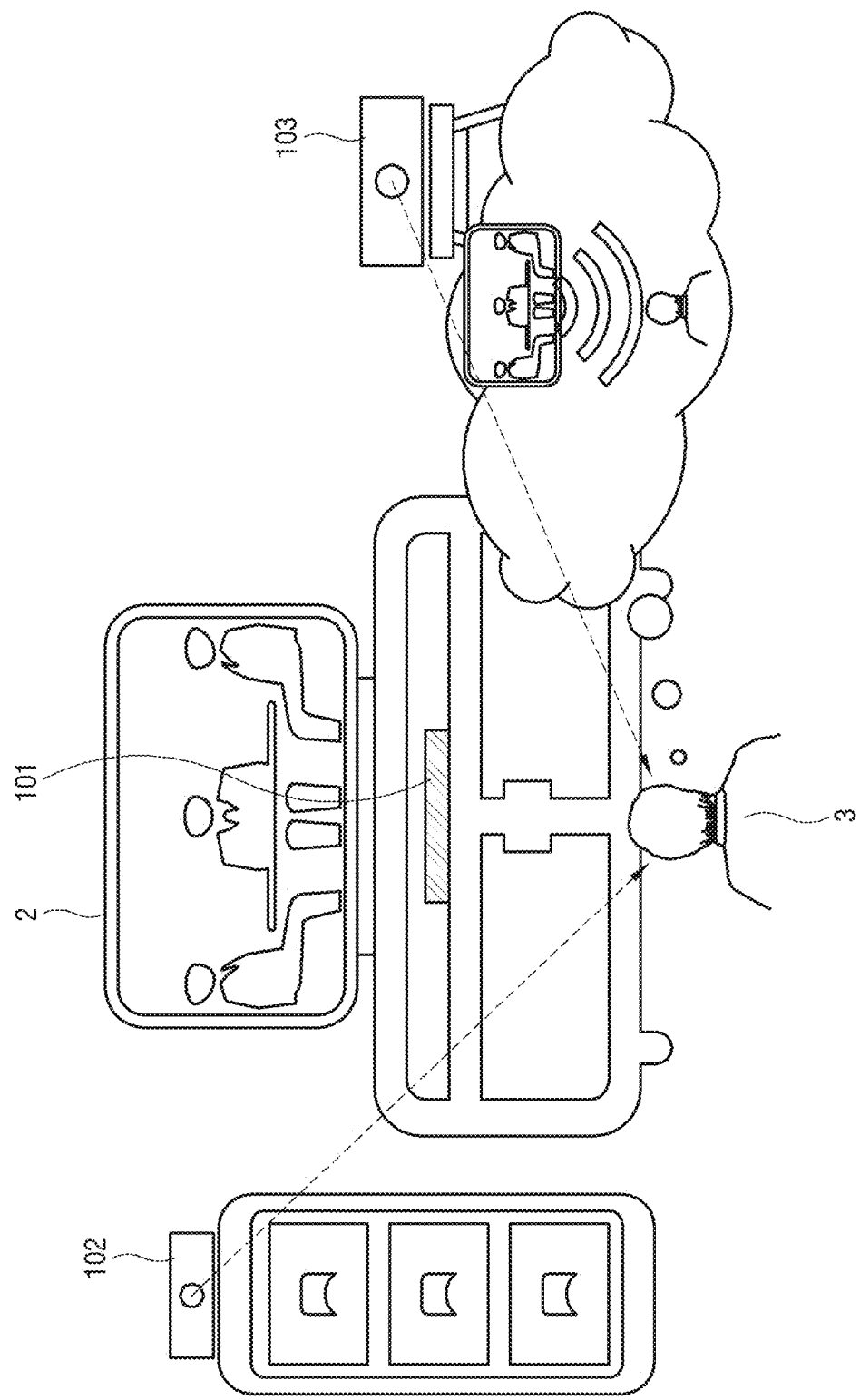
FIG. 14 is a diagram illustrating an example in which a corrected sound signal is output from the electronic apparatus according to the embodiment of the disclosure.

FIG. 14 is a diagram illustrating an example in which a corrected sound signal is output from the electronic apparatus according to the embodiment of the disclosure.

As illustrated in FIG. 14, in the installation environment in which the left and right channel speakers 102 and 103 for outputting the sound of the TV as the signal supply source 2 are irregularly arranged, the sound signal is output from the speakers 102 and 103.

The sound signals output from the speakers 102 and 103 are subjected to the first correction (in-head localization) and the second correction (and out-of-head localization) in FIG. 9, and as illustrated in FIG. 14, the user, that is, the listener 3 feels that the sound signal is reproduced at a predetermined virtual position (the position of the TV as the signal supply source 2) regardless of the physical and spatial positions of the speakers 102 and 103, and the degree of freedom of installation for a plurality of speakers according to the output channel in the space increases.

In the embodiment of the disclosure as described above, the corrections in the case where the sound signals of the left and right channels are output have been described, but the disclosure is not limited thereto. That is, the electronic apparatus according to another embodiment of the disclosure may compensate for and output sound signals composed of 3, 5, 7, 9, or more channels regardless of the number of actually installed speakers.

Figure 15:
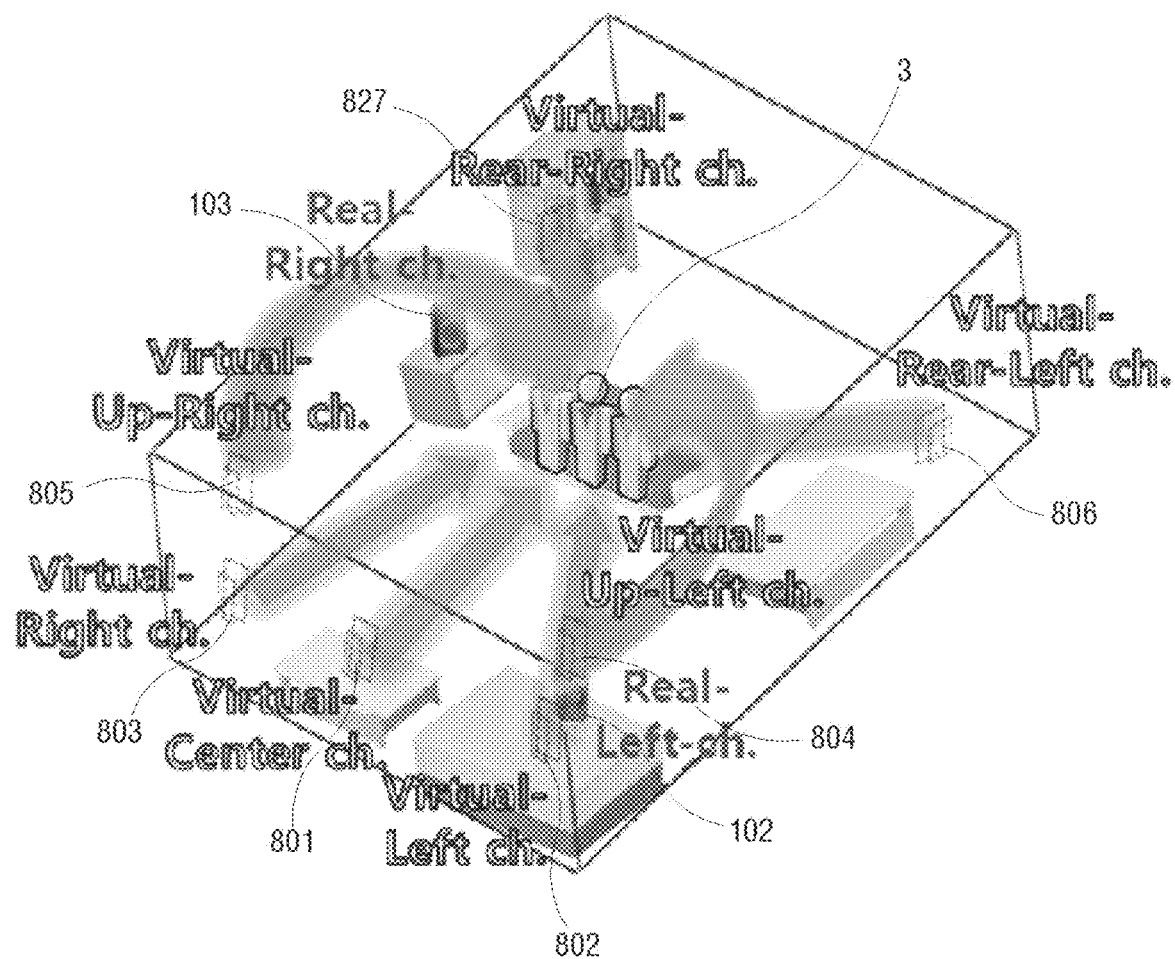
FIG. 15 is a diagram illustrating an example in which a corrected sound signal is output from an electronic apparatus according to another embodiment of the disclosure.

FIG. 15 is a diagram illustrating an example in which a corrected sound signal is output from an electronic apparatus according to another embodiment of the disclosure.

The electronic apparatus 1 of another embodiment receives a sound signal composed of seven channels from the signal supply source 2, and, as illustrated in FIG. 15, controls the compensated sound signal to be output from the speakers 102 and 103 so that the sound image is positioned at seven virtual positions 801, 802, 803, 804, 805, 806, and 807, thereby configuring a virtual surround sound field.

Specifically, the processor 170 reads the head transfer function corresponding to the positions of the speakers 102 and 103 from the database 161, and derives the cross talk canceller function matrix using the read head transfer function.

The processor 170 performs the first correction for convolving the input sound signal with the cross talk canceller function matrix.

In addition, the processor 170 reads head transfer functions (head transfer function for replacement) corresponding to the seven virtual positions 801, 802, 803, 804, 805, 806, and 807 from the database 161, and performs the second correction for convolving the sound signal on which the first correction is performed with the head transfer function for replacement.

As described above, the sound signals of the seven channels on which the first correction and the second correction are performed are reproduced in the seven virtual positions 801, 802, 803, 804, 805, 806, and 807 by the listener 3, so the effect of extending the surround sound field may be realized.

Meanwhile, according to another embodiment of the disclosure, the electronic apparatuses 1 and 10 may control to perform the first and second corrections on the sound signal in response to the position of the listener 3.

Figure 16:
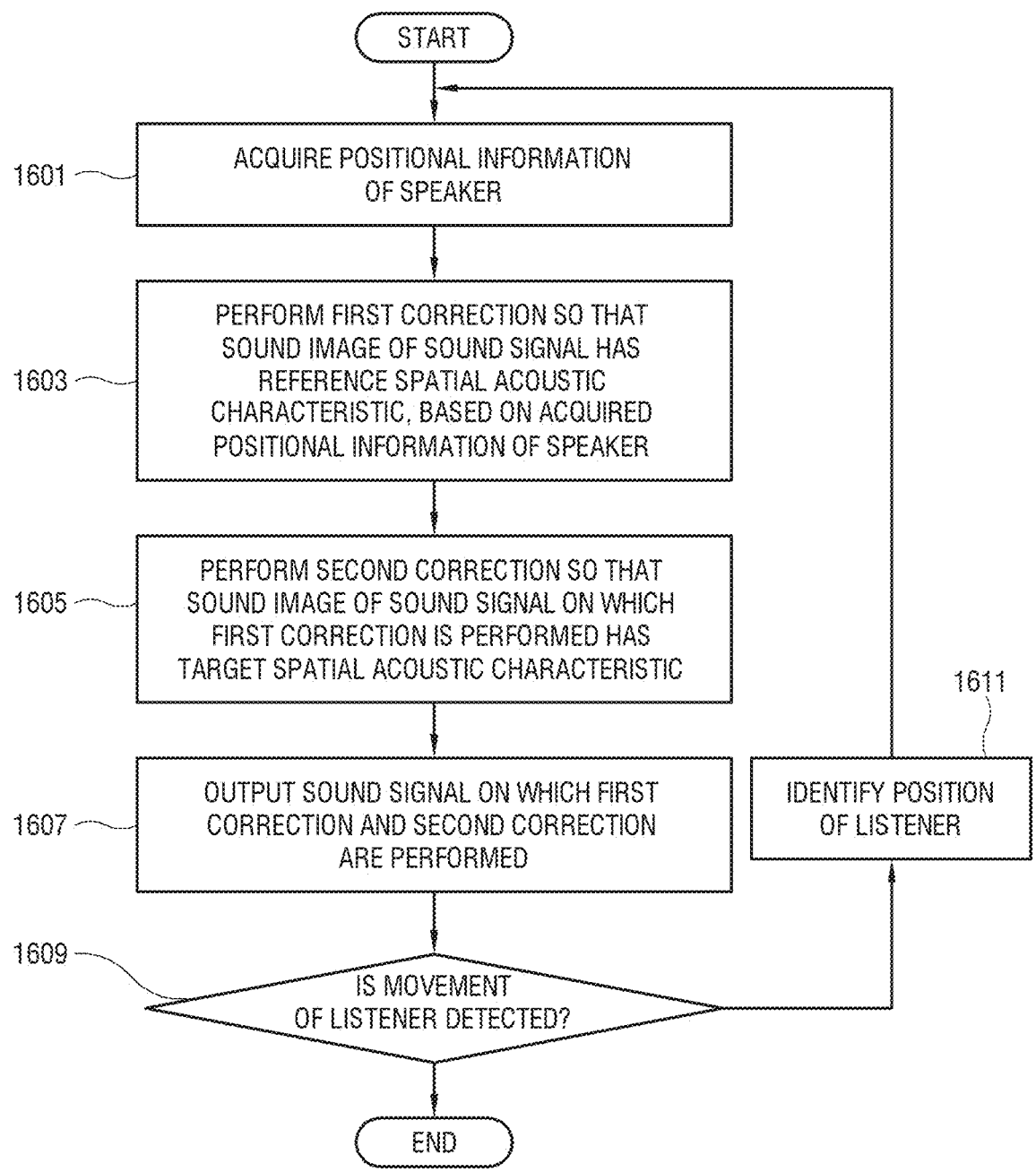
FIG. 16 is a flowchart illustrating a control method of an electronic apparatus according to another embodiment of the disclosure.
Figure 17:
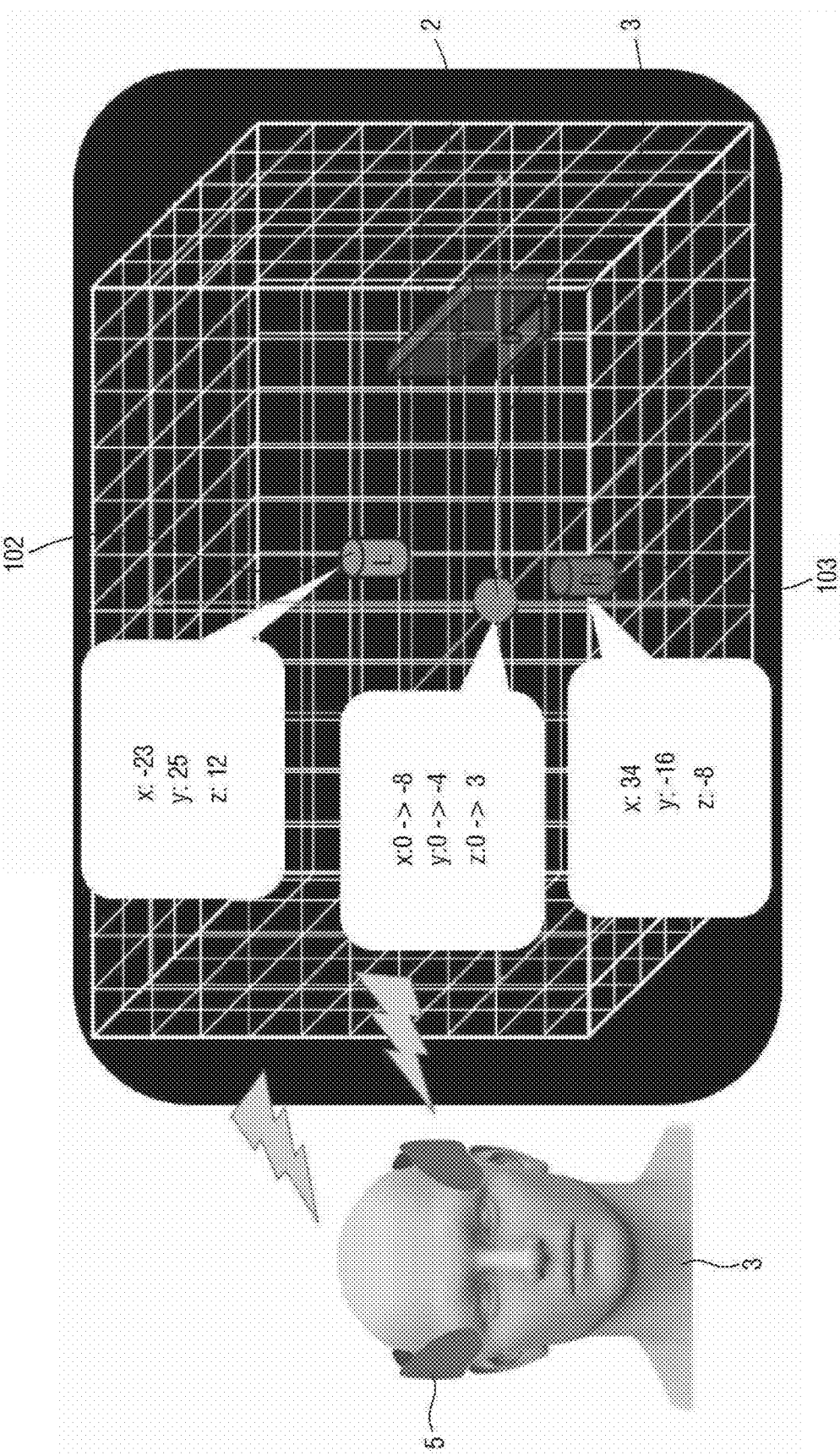
FIGS. 17 and 18A, 18B, and 18C are diagrams illustrating an example in which a corrected sound signal is output from the electronic apparatus according to the embodiment of FIG. 16.

FIG. 16 is a flowchart illustrating a control method of an electronic apparatus according to another embodiment of the disclosure, and FIGS. 17 and 18 are diagrams illustrating an example of outputting a corrected sound signal from the electronic apparatus according to the embodiment of FIG. 16.

As illustrated in FIG. 16, the electronic apparatus 1 acquires the positional information of the speakers 102 and 103 (1601). Here, the positions of the speakers 102 and 103 are positions relative to the position of the listener 3, and the positional information may be acquired by setting the three-dimensional space having the Cartesian coordinate system with the head position of the listener 3 as the origin, as described in the embodiment of FIG. 9, and using various position tracking methods including those described in FIGS. 10 to 13.

The processor 170 of the electronic apparatus 1 performs the first correction so that the sound image of the sound signal has the predetermined reference spatial acoustic characteristic, based on the positional information of the speakers 102 and 103 acquired in step 1601 (1603). Since the first correction performed in step 1603 is performed by the method described in step 603 of the embodiment of FIG. 9, a detailed description thereof will be omitted.

The processor 170 performs second correction so that the sound image of the sound signal on which the first correction has been performed in step 1603 has the target spatial acoustic characteristic (1605). Since the second correction performed in step 1605 is performed by the method described in step 605 of the embodiment of FIG. 9, a detailed description thereof will be omitted.

In addition, the sound signal in which the first correction and the second correction have been performed in steps 1603 and 1605 are output from the speakers 102 and 103 (1607).

In the state in which the corrected sound signal as described above is output from the speakers 102 and 103, the electronic apparatus 1 of another embodiment may detect the movement of the listener 3 (1609). Here, the processor 170 may use the detector 140 as described in FIG. 4 to track the position of the listener 3 in real time or at regular time intervals, thereby detecting the movement of the listener 3.

The processor 170 identifies the position of the listener 3 according to the movement detected in step 1609 (1611). The method of identifying a position of a listener 3 is not limited, and as an example, as illustrated in FIG. 17, the sensor signal output from the motion recognition sensor, the position sensor, or the like that is provided in the terminal device 5 (for example, wearable device such as the head mounted device (HMD)) that the listener 3 can wear or carry is detected by the detector 140, and thus can be identified.

The processor 170 may identify the position of the listener 3 and change coordinate values x, y, and z of the listener 3 in the three-dimensional space as illustrated in FIG. 17 to correspond to the identified position.

If the position of the listener 3 is identified in step 1611, the processor 170 reacquires the positions of the speakers 102 and 103 relative to the identified position (1601).

Then, the first correction of step 1603 and the second correction of step 1605 are sequentially performed on the sound signal based on the positional information of the speakers 102 and 103 reacquired in step 1601, and the corrected sound according to the performance is output from the speakers 102 and 103.

Figure 18C:
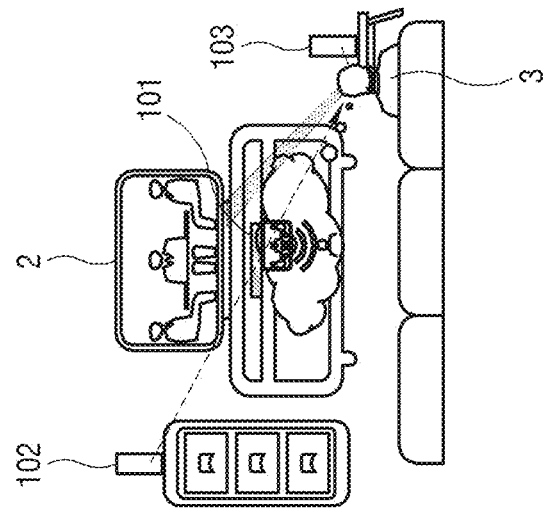
Figure 18B:
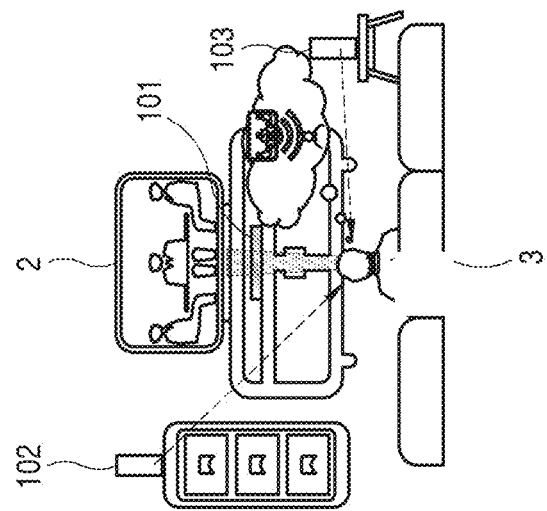
Figure 18A:
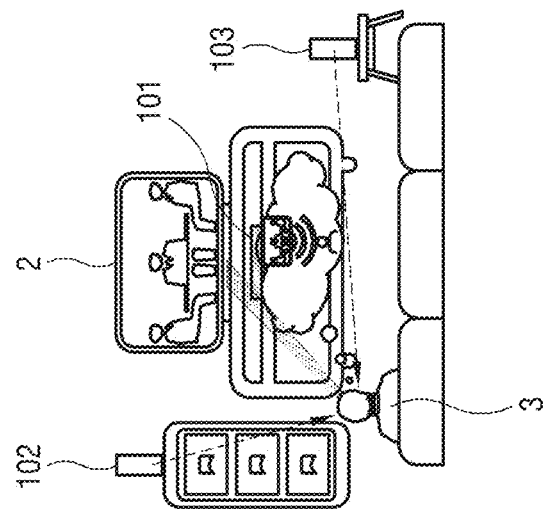

Accordingly, as illustrated in FIGS. 18A, 18B, and 18C, even if the position is continuously changed according to the movement of the listener 3, the corrected sound signal is output according to the performance of in-head localization and out-of-head localization according to the changed position, so the listener 3 can feel that the sound source is continuously being played in the desired virtual position regardless of the position movement of his or her position, that is, the movement.

Hereinabove, the disclosure has been described in detail through the preferred embodiments, but the disclosure is not limited thereto and may be implemented in various ways within the scope of the claims.

What is claimed is:

1. An electronic apparatus, comprising:
   a signal processor configured to process sound signals output through a plurality of speakers comprising a left speaker and a right speaker; and
   a processor configured to:
      acquire positional information of the plurality of speakers that outputs sound, based on the processed sound signal, the plurality of speakers being asymmetrically disposed with respect to a listener,
      select head transfer functions corresponding to the acquired positional information of each of the plurality of speakers from a database storing information on sound signals acquired for each positional information of a sound source,
      derive a cross talk canceller function matrix that cancels an interference of each channel of the sound signals using the selected head transfer functions corresponding to the acquired positional information,
      perform a first correction for convolving the derived cross talk canceller function matrix with the sound signals so that each of sound images of the sound signals has a reference spatial acoustic characteristic based on the acquired positional information of the plurality of speakers,
      select head transfer functions corresponding to target points indicating virtual sound source positions from the database, and
      perform a second correction for convolving the selected head transfer functions corresponding to the target points with each of the sound signals on which the first correction is performed so that each of the sound images of the sound signals on which the first correction is performed has a target spatial acoustic characteristic corresponding to the virtual sound source positions, the virtual sound source positions being disposed to be symmetric with respect to both ears of the listener.

2. The electronic apparatus of claim 1, wherein the selected head transfer functions corresponding to the acquired positional information of each of the plurality of speakers comprises a head transfer function of a directional path through which a sound wave output from each of the plurality of speakers reaches measuring points corresponding to both ears of a listener, and a head transfer function of a crosstalk path.

3. The electronic apparatus of claim 1, wherein each of the sound signals having the reference spatial acoustic characteristic has the sound image positioned at a reference point within a head of the listener.

4. The electronic apparatus of claim 1, wherein each of the sound signals having the target spatial acoustic characteristic has the sound image extended to a target point outside a head of the listener.

5. The electronic apparatus of claim 1, wherein each of the sound signals on which the second correction is performed has an extended sound field so that each of the sound images has the target spatial acoustic characteristic, and is positioned at a virtual sound source position corresponding to a target point.

6. The electronic apparatus of claim 1, further comprising:
   a detector configured to detect a movement of the listener, wherein the processor is configured to:
      identify a position of the listener based on the detection result of the detector,
      reacquire the positional information of the plurality of speakers indicating a position relative to the identified position of the listener, and
      perform the first correction and the second correction on the sound signals based on the reacquired positional information of the plurality of speakers.

7. A control method of an electronic apparatus, the method comprising:
   acquiring positional information of a plurality of speakers that outputs sound corresponding to sound signals, the plurality of speakers comprising a left speaker and a right speaker, and being asymmetrically disposed with respect to a listener;
   selecting head transfer functions corresponding to the acquired positional information of each of the plurality of speakers from a database storing information on sound signals acquired for each positional information of a sound source;
   deriving a cross talk canceller function matrix that cancels an interference of each channel of the sound signals using the selected head transfer functions corresponding to the acquired positional information;
   performing a first correction for convolving the derived cross talk canceller function matrix with the sound signals so that each of sound images of the sound signals has a reference spatial acoustic characteristic based on the acquired positional information of the plurality of speakers;

selecting head transfer functions corresponding to target points indicating virtual sound source positions from the database; and performing a second correction for convolving the selected head transfer functions corresponding to the target points with each of the sound signals on which the first correction is performed so that each of the sound images of the sound signals on which the first correction is performed has a target spatial acoustic characteristic corresponding to the virtual sound source positions, the virtual sound source positions being disposed to be symmetric with respect to both ears of the listener.

8. The control method of an electronic apparatus of claim 7, wherein the selected head transfer functions corresponding to the acquired positional information of each of the plurality of speakers comprises a head transfer function of a directional path through which a sound wave output from each of the plurality of speakers reaches measuring points corresponding to both ears of a listener, and a head transfer function of a crosstalk path.

9. The control method of an electronic apparatus of claim 7, wherein
each of the sound signals having the reference spatial acoustic characteristic has the sound image positioned at a reference point within a head of the listener.

10. The control method of an electronic apparatus of claim 7, wherein
each of the sound signals having the target spatial acoustic characteristic has the sound image extended to a target point outside a head of the listener.

11. The control method of an electronic apparatus of claim 7, wherein each of the sound signals on which the second correction is performed has an extended sound field so that each of the sound images has the target spatial acoustic characteristic, and is positioned at a virtual sound source position corresponding to a target point.

\* \* \* \* \*